United States Patent [19]

Ohtani et al.

[11] Patent Number: 5,517,666
[45] Date of Patent: May 14, 1996

[54] PROGRAM CONTROLLED PROCESSOR WHEREIN VECTOR DISTRIBUTOR AND VECTOR COUPLER OPERATE INDEPENDENTLY OF SEQUENCER

[75] Inventors: Akihiko Ohtani, Moriguchi; Toshiyuki Araki, Takatsuki; Kunitoshi Aono, Hirakata; Toshihide Akiyama, Takatsuki, all of Japan

[73] Assignee: Matsushita Electric Industrial Co., Ltd., Osaka, Japan

[21] Appl. No.: 185,367

[22] Filed: Jan. 24, 1994

[30] Foreign Application Priority Data

Jan. 22, 1993 [JP] Japan .................................. 5-008958
Apr. 26, 1993 [JP] Japan .................................. 5-099137

[51] Int. Cl.⁶ .................................................. G06F 15/347
[52] U.S. Cl. ........................ 395/800; 395/375; 395/410; 395/427; 364/232.21; 364/931.51; 364/DIG. 1; 364/DIG. 2
[58] Field of Search ................... 395/800, 400, 395/375, 425; 364/DIG. 1, DIG. 2

[56] References Cited

U.S. PATENT DOCUMENTS

| | | | |
|---|---|---|---|
| 4,633,389 | 12/1986 | Tanaka et al. | 364/DIG. 1 |
| 4,722,052 | 1/1988 | Scheuneman | 364/DIG. 1 |
| 4,837,730 | 6/1989 | Cook et al. | 364/DIG. 1 |
| 4,849,882 | 7/1989 | Aoyama et al. | 364/DIG. 1 |
| 4,860,245 | 8/1989 | Kinoshita | 364/DIG. 2 |
| 4,875,161 | 10/1989 | Lahti | 364/DIG. 1 |
| 4,890,220 | 12/1989 | Nakagawa et al. | 364/DIG. 1 |
| 4,964,035 | 10/1990 | Aoyama et al. | 364/DIG. 1 |
| 5,109,499 | 4/1992 | Inagami et al. | 395/425 |
| 5,299,320 | 3/1994 | Aono et al. | 395/375 |
| 5,367,654 | 11/1994 | Furukawa et al. | 395/425 |

FOREIGN PATENT DOCUMENTS

| | | | |
|---|---|---|---|
| 0085435 | 10/1983 | European Pat. Off. | |
| 3210816 | 10/1982 | Germany | G06F 15/31 |
| 5-61901 | 3/1991 | Japan | |

OTHER PUBLICATIONS

"An Interleaved Array–Processing Architecture", AFIPS Conference Proceedings Jul. 9, 1984, Jump et al. pp. 93–100.
"The OPSILA Computer", Parallel Algorithms and Architectures, Apr. 14, 1986, Augin and Boeri, pp. 143–153.

*Primary Examiner*—Alyssa H. Bowler
*Assistant Examiner*—Walter D. Davis, Jr.
*Attorney, Agent, or Firm*—Wenderoth, Lind & Ponack

[57] ABSTRACT

A program controlled processor comprises a scalar processing unit 101 for normal data (=scalar) operations and branch processing, a plurality of vector processing units 102 of identical structure, a vector distributor 103 for distributing input data as block vectors to vector memory 304 in each vector processing unit 102, a vector coupler 104 for coupling the block vectors stored in vector memory 404 in each vector processing unit 102 to provide output vectors, an instruction memory 105 for storing the operations of these circuit blocks as an operating program, a sequencer 106 for sequentially reading the instruction memory 105, and a decoder 107 for interpreting the read instructions and outputting a control signal to each circuit block. The scalar processing unit 101 comprises a scalar bus input enabling the scalar processing unit 101 to refer scalar registers in the vector processing units 102. The program controlled processor has improved data processing performance because parallel vector instructions are operated in parallel in the vector processing units of block data distributed by the vector distributor.

9 Claims, 19 Drawing Sheets

(1) Receive input vectors and write block vectors — S620

(2) Execute vector instructions (accumulate vector block elements) — S622

(3) Devide the sum by the total element number — S624

S600 Receive input data
S602 Accumulate data
S604 All data accumulated? NO (loop back) / YES
S606 Divide the sum by the total element number

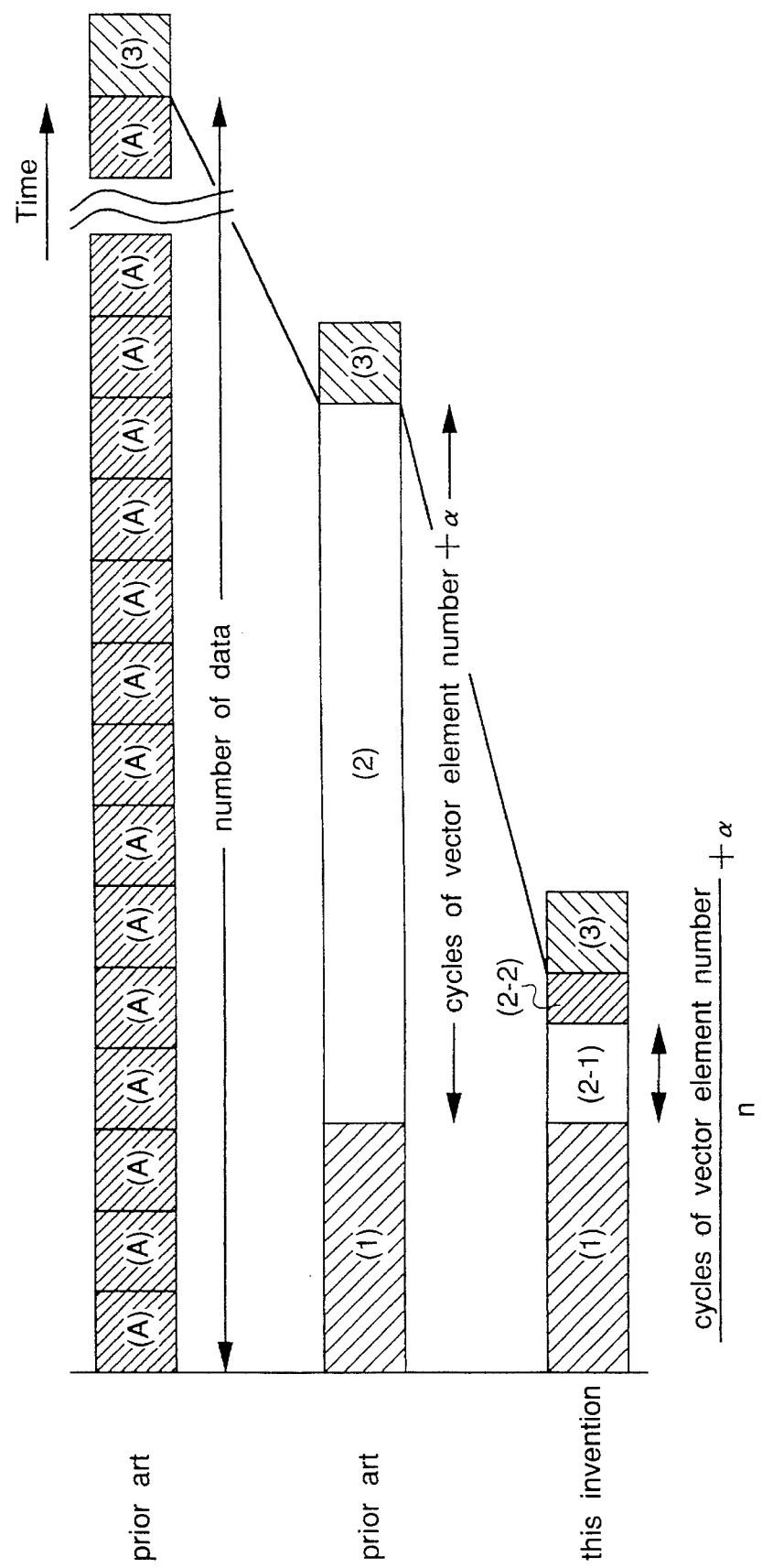

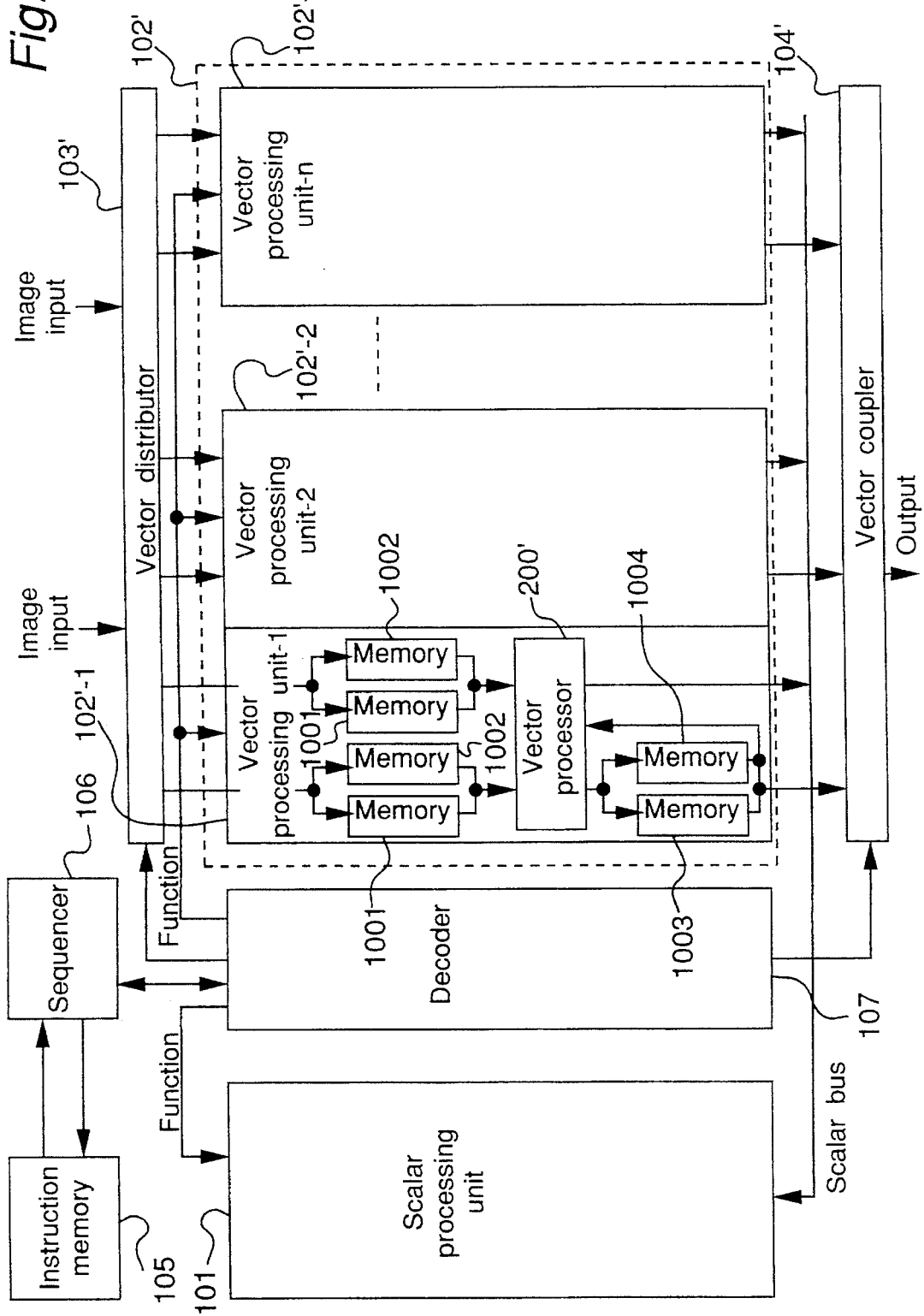

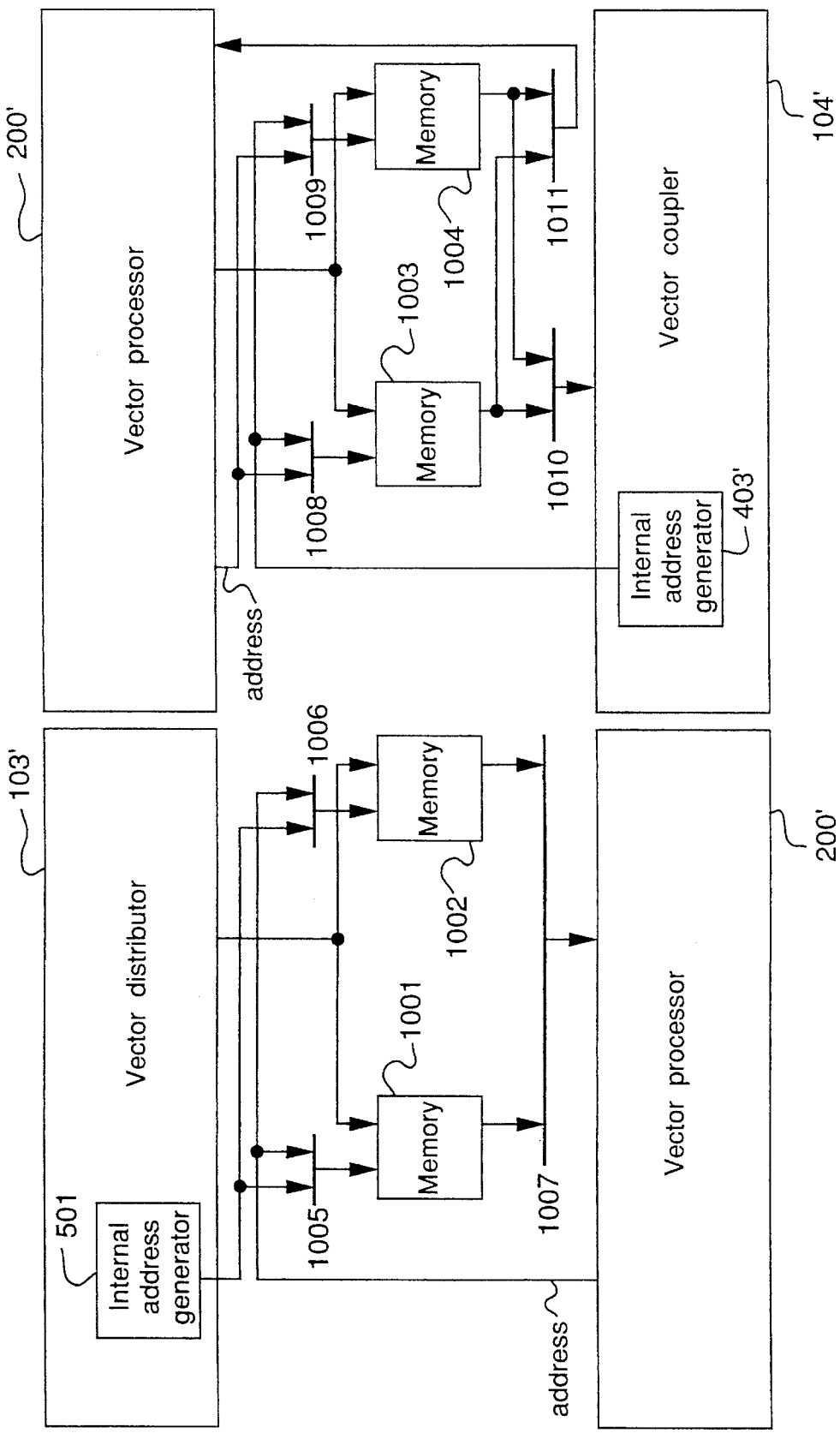

Fig.19(a)    Fig.19(b)
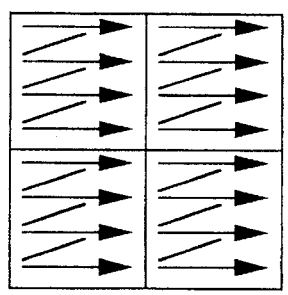 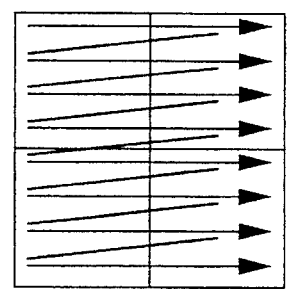
Fig.20(a)
Fig.20(b)
Fig.23(a)
Fig.23(b)
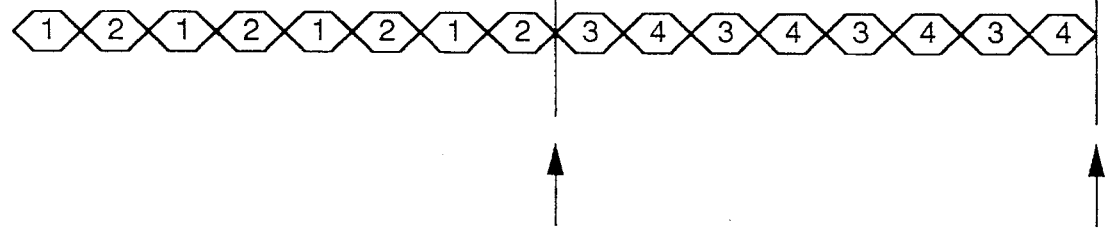
When bit 6 is a terminate signal    When bit 7 is a terminate signal

PROGRAM CONTROLLED PROCESSOR WHEREIN VECTOR DISTRIBUTOR AND VECTOR COUPLER OPERATE INDEPENDENTLY OF SEQUENCER

BACKGROUND OF THE INVENTION

1. Field of the Invention

The present invention relates to a program controlled processor for use where high speed operating performance is required, and in detail to the architecture of a digital signal processor (DSP) used in digital signal processing applications.

2. Description of the Prior Art

An instruction set of a prior art program controlled processor such as a microprocessor includes ordinary instructions such as operations, reading and writing to and from a memory or register and branching. A program using these instructions can implement various processings by executing these instructions sequentially one at a time.

In dynamic image processing and other digital signal processing applications requiring high speed operating performance, however, improving the processing performance of a program controlled digital signal processor (DSP) has been an obstacle to be solved.

For example, Japanese laid-open Patent Publication No. 61,901/1993 has proposed a method to solve this problem. This method provides a pipeline operator as an operating resource of a processor, and includes vector processing instructions in the instruction set.

Demand for higher resolution dynamic image processing is growing, however, and further improvement of processor performance is now a problem. More specifically, in high resolution dynamic image processing applications requiring high speed processing of large amounts of data, the architectures of prior art program controlled processors offer insufficient processing performance, and improving data processing performance is the single biggest problem.

SUMMARY OF THE INVENTION

An object of the present invention is to provide a high performance program controlled processor.

In one aspect of the present invention, a program controlled processor can execute plural operations simultaneously in parallel to achieve high performance by using a plurality of vector processors for executing a plurality of parallel instructions including parallel vector instructions, a scalar processors for executing a scalar operation, a vector distributor and a vector coupler. The vector processors execute vector operations based on parallel vector instructions during pipeline processing. The scalar processors is connected via a bus to the vector processors. The program controlled processor further comprises an instruction memory, a sequencer, and a decoder for interpreting program instructions. The decoder controls all of the vector processors to execute the same operation if an instruction to be executed is a parallel instruction and for controlling the scalar processor to execute a scalar operation if an instruction to be executed is not a parallel instruction. A vector distributor divides input vector data into a plurality of block vectors, wherein the number of the block vectors is the same as that of the vector processing units, and for sending the block vectors to corresponding vector processors. The vector coupler couples the obtained block vectors with a parallel vector instruction to send an output vector. If an instruction to be executed is a parallel vector instruction, of which the result is a vector, the vector processing means store the results of the processing in the vector processors and output the results to the vector coupler, while if an instruction to be executed is a parallel vector instruction, of which the result is a scalar, the scalar processors can receive the scalar results from plurality of the vector processors via the bus.

In a second aspect of the invention, in a vector processors, each of the memories used to write or read block vector data comprise plural buffer memories. A vector distributor and a vector coupler operate independently of the sequencer. The vector distributor and the vector coupler operate independently of the sequencer and block vector data is written in one memory of the buffer memories while block vector data can be read from another buffer memories or vice versa. Thus, the vector processors can perform parallel vector operations simultaneously with the input/output of input/output vectors.

In a third aspect of the present invention, in a program controlled processor, a parallel vector instruction includes a control indicator indicating the vector processors to be operated. The decoder sends a signal to the vector processors indicated by the indicator for operation.

In a fourth aspect of the present invention, a memory for storing block vectors in all of the parallel vector processors means comprises a memory element for storing a block vector and a controller connected to the memory element for controlling whether a block vector is written or read to or from the memory element. The program controlled processor further comprises an address decoder for sending a signal to all of the controllers for simultaneously writing or reading block vectors to or from the memory elements.

In a fifth aspect of the invention, the vector distributor or the vector coupler comprises an address generator for controlling the access of a plurality of memory to write or read $(2^{nx} \times 2^{ny})$ of $(2^{nx} \times 2^{ny} \times 2^{mx} \times 2^{my})$ data to or from $(2^{mx} \times 2^{my})$ memory elements in the program controlled processor where nx, ny, mx and my are natural numbers. Thus, the number of pins can be reduced because address pins are not required. For example, the address generator comprises: an (nx+ny+mx+my)-bit address counter for counting data accesses when data access begins; a switch circuit for changing the order of the address counter output bits according to an access method signal to designate the order; and an access controller for sending memory access signals to the $(2^{mx} \times 2^{my})$ memory elements. The switch circuit outputs bits 1 to (nx+ny) as an address to the $(2^{mx} \times 2^{my})$ memory elements and bits (nx+ny+1) to (nx+ny+mx+my) to the access controller. Thus, the data can be distributed or coupled by using a simple circuit.

In a sixth aspect of the present invention, in an address generator for a square image wherein mx=my=m and nx=ny=n, an (n+n+m+m+1)-bit address counter counts data accesses when data access begins. In order to access the memories, i address selectors ($1 \leq i \leq n$) select bit (n+i) or bit (n+m+i) of the address counter, while j memory address selectors ($1 \leq j \leq m$) select bit (n+n+j) when bit (n+i) is selected by the i address selectors and select bit (n+j) when bit (n+m+i) is selected by the i address selectors wherein i, j, m and n are natural numbers. A terminate signal selector selects bit (2×n+2×m+1) or bit (2×n+2×m) according to a memory number selection signal for selecting access to the $2^{2 \times m}$ memory elements or the $2^m$ memory elements. An access controller sends memory access signals to the $(2^m \times 2^m)$ memory elements. Bits 1 to n of the address counter and the outputs of the i address selector are output as an address to the $2^{2 \times m}$ memory elements. The outputs of the j memory address selector and bits (n+n+m+1) to (n+n+m+m) of the address counter are input to the access controller. The terminate signal selector selects bit (n+n+m+m+1) if a memory number selection signal selects the access to the $2^{2 \times m}$ memory elements, and selects bit (n+n+ m+m) if the memory number selection signal selects the access to the $2^m$ memory elements.

An advantage of the present invention is that the vector processing can be performed in a shorter time by using parallel vector processing by processing data divided for each vector processor.

Another advantage of the present invention is that the number of pins of the program controlled processor can be reduced.

BRIEF DESCRIPTION OF THE DRAWINGS

The present invention will become more fully understood from the detailed description given below and the accompanying diagrams wherein:

FIG. 8 shows a comparison of the processing time in a conventional program controlled processor and the program controlled processor shown in FIG. 1;

FIG. 9 is a block diagram of a program controlled processor according to the second embodiment of the present invention;

FIGS. 10(a) and 10(b) are block diagrams of the double-buffer vector memory in the program controlled processor shown in FIG. 9;

FIGS. 19(a) and 19(b) are diagrams to illustrate the access methods of the present invention;

FIGS. 20(a) and 20(b) are diagrams to show the data input sequence;

FIGS. 23(a) and 23(b) are diagrams of data input sequence in the present invention;

DESCRIPTION OF PREFERRED EMBODIMENTS

Figure 1:
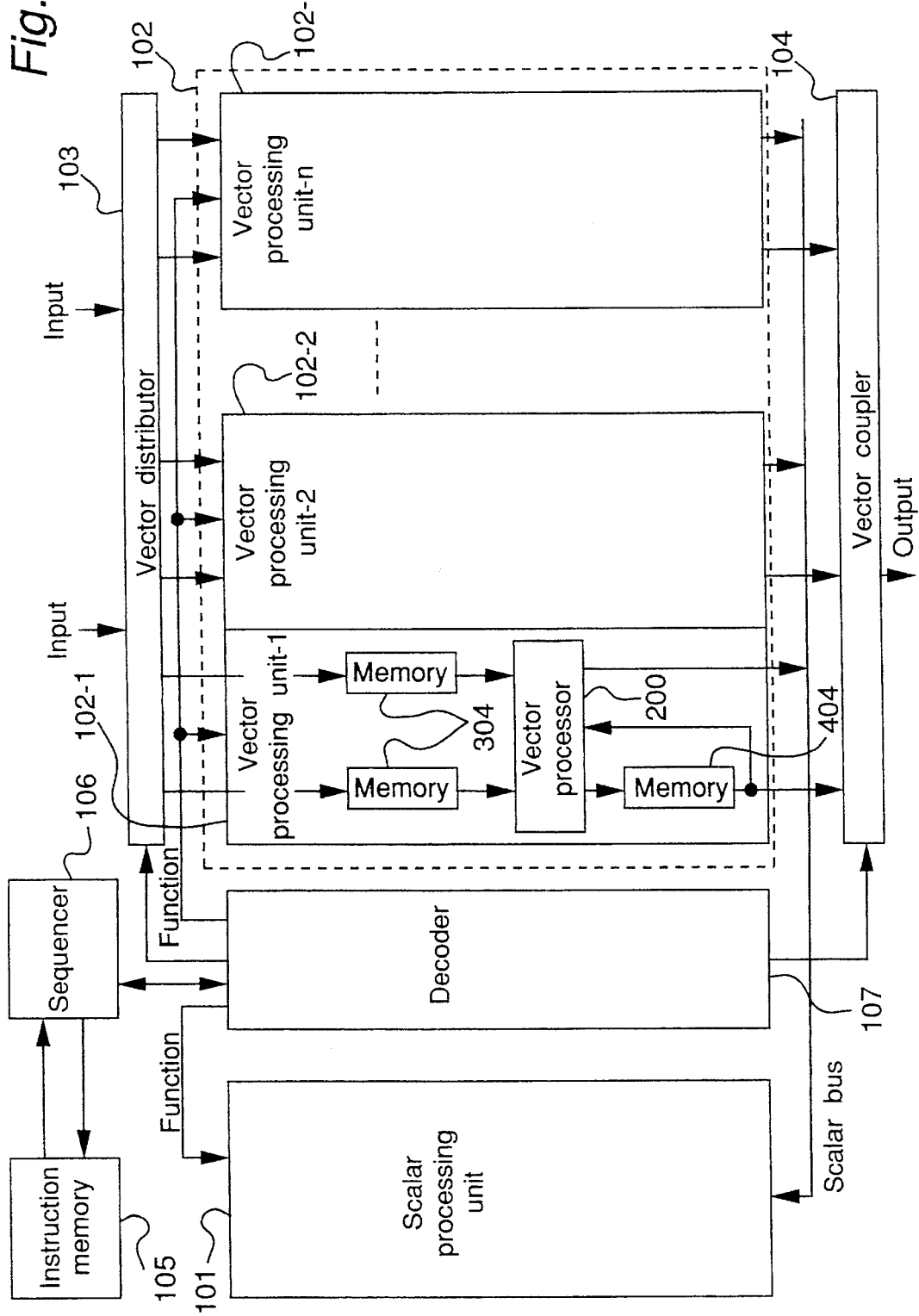
FIG. 1 is a block diagram of a program controlled processor according to the first embodiment of the present invention.

Referring now to the drawings, wherein like reference characters designate like or corresponding parts throughout the drawings, FIG. 1 is a block diagram of a program controlled processor in accordance with a first embodiment of the present invention. As shown in the drawing, this processor receives two series of image data inputs (or input vectors) which are processed by programmed control to output an image signal (or output vector) or a scalar quantity.

The primary components of this program controlled processor include a scalar processing unit 101 (SPU), a vector processor 102 including n vector processing units (VPU) 102-1– 102-n, a vector distributor 103, a vector coupler 104, an instruction memory 105, a sequencer 106 and a decoder 107. The instruction memory 105 stores a program on the operation of these circuit blocks. The sequencer 106 sequentially reads a program stored in the instruction memory 105, and the decoder 107 interprets a read instruction and outputs a control signal to each circuit block. The scalar processing unit 101 comprises an arithmetic and logic circuit, registers and the like as in a prior art processor, for normal data operations such as addition, subtraction and branch operations. It further comprises a scalar bus input for referring to scalar registers 206 (FIG. 2) in the vector processing units 102. The vector processing units 102-1– 102-n are connected in parallel to the vector distributor 103 and to the vector coupler 104. The vector distributor 103 receives two series of input data and divides each of the input vector data into block vectors to be distributed to vector memories 304 provided in vector processing units 102-1– 102-n. The decoder 107 sends an instruction via a same signal line to the vector processing units 102-1–102-n. The vector coupler 104 couples block vectors stored in vector memories 404 as results of the processing in the vector processing units 102-1–102-n to send an output vector.

In image processing, many applications such as spatial filtering, pattern matching and image compression/expansion can perform parallel processing in n pixel× n pixel (block) units. Usually, the content of the processing on a block data includes combinations of vector operations which are similar for all blocks.

The vector operation is performed by treating pixels in a block as elements $X_i$ of a vector X where i=1, 2, . . . , k. For example, a subtraction operation for obtaining a difference Z between two blocks is expressed by Equation (1); an operation for obtaining a product sum Z is expressed by Equation (2); and an operation for obtaining a total sum Z is expressed by Equation (3). The result of the operation by Equation (1) is a vector, while the results of the operation of Equations (2) and (3) are scalars.

$$Z_i = X_i - Y_i. \tag{1}$$

$$Z = \sum_{i=1}^{k} (X_i \times Y_i). \tag{2}$$

$$Z = \sum_{i=1}^{k} X_i. \tag{3}$$

Each of the vector processing units 102-1–102-n of the program controlled processor shown in FIG. 1 has an identical structure. For example, the vector processing unit 102-1 comprises a processor 200 for executing vector operations in block units and vector memories 304 and 404 for storing input/output vector data. The two vector memories 304 store two series of vector block data received from the vector distributor 103, respectively. The vector processor 200 processes vector operation on the block data stored in the memories 304 and sends a vector data to the memory 404 and a scalar data via the scalar bus to the scalar processing unit 101. The memory 404 sends a vector data to the vector coupler 104 as well as to the vector processor 200 itself for the operation using the vector data. Therefore, the vector processor 200 can perform a vector operation based on the output data thereof.

Figure 2:
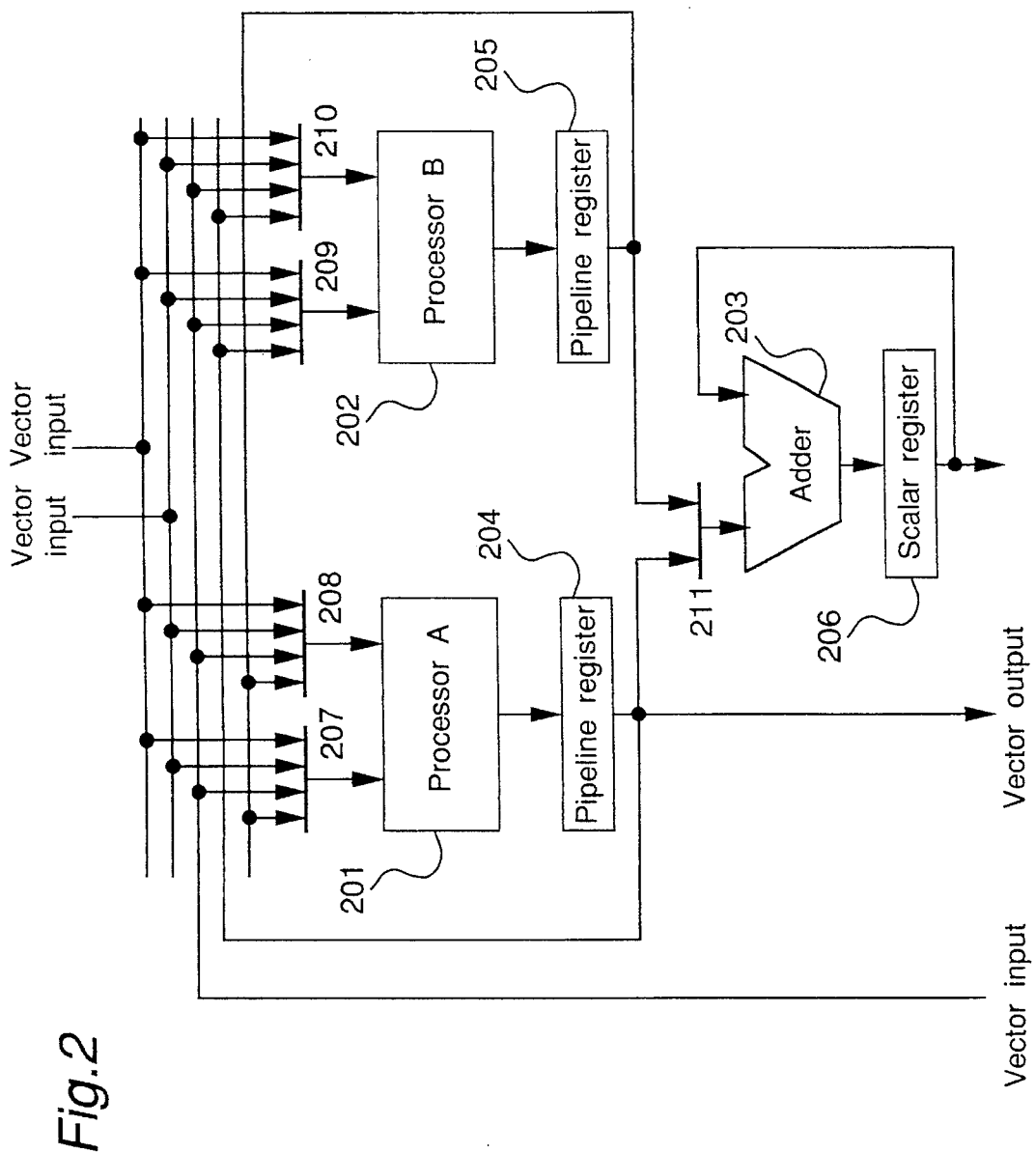
FIG. 2 is a block diagram of the vector processing units in FIG. 1.

FIG. 2 shows an example of a configuration of the vector processor 200 shown in FIG. 1. This vector processor 200 comprises processors (A) 201 and (B) 202 such as arithmetic and logic units, an adder 203 such as a multiplier, two pipeline registers 204 and 205, and a scalar register 206 for storing accumulated data. These elements 201–206 are coupled by selectors 207, 208, 209, 210 and 211 for pipeline processing. The selectors 207 and 208 select one of the vector inputs from the two memories 304, the output of the memory 404 and the output of the pipeline register 204 and send data to the processor 201 and send selected data to the processor 201, while the selectors 209 and 210 select one of the vector inputs from the two memories 304, the output of the memory 404 and the output of the pipeline register 205 and send selected data to the processor 202. The output data of the processors 201 and 202 are stored in the pipeline registers 204 and 205, respectively. One piece of the output data of each pipeline register 204 and 205 is supplied to the adder 203, while an output data of the scalar register 206 for storing the result of the addition of the adder 203 is also supplied to the adder 203. The scalar register 206 stores scalar data and sends it to the scalar bus, while the pipeline register 204 sends vector data to the memory 404.

All vector processing units 102-1–102-n in the program controlled processor operate similarly under the activation by the decoder 107 via the same signal line by using the vector processors 200. The same vector operation is applied to the block vectors stored in the vector memories 404 simultaneously in parallel in the vector processing units. Vectors obtained in the vector operations are stored in the vector memories 404, while a scalar result is stored in the scalar register 206. The scalar register 206 sends data over the scalar bus either simultaneously or sequentially to the scalar processing unit 101.

Figure 3:
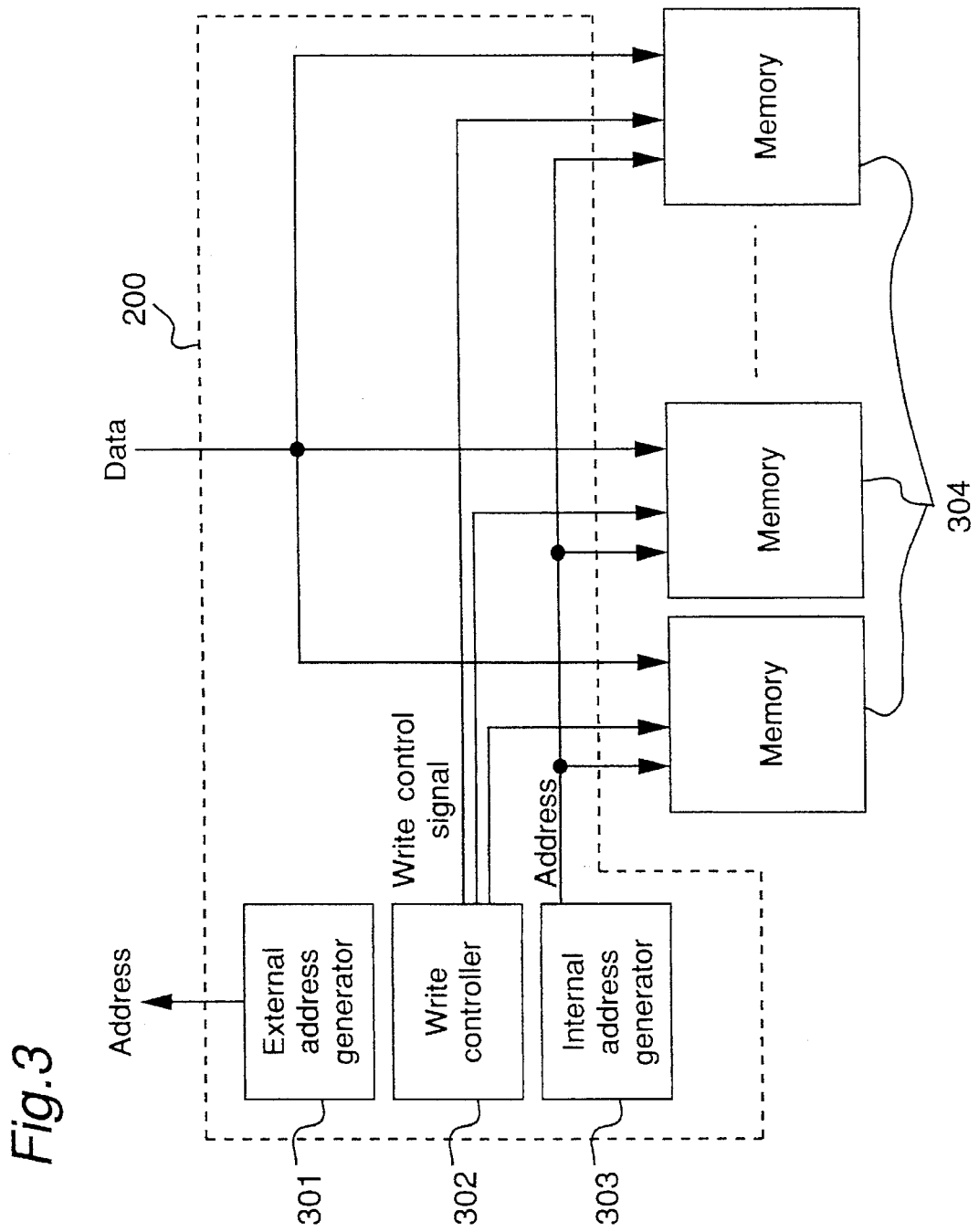
FIG. 3 is a block diagram of a vector distributor in FIG. 1.

FIG. 3 shows an example of the vector distributor 103. In the vector distributor 103, an external address generator 301 generates an external address, and a write controller 302 controls writing to the vector memory 304 in the vector memories 304 in all the vector processing units 102-1–102-n to store a data at the external address by using write control signals. An internal address generator 303 generates an address supplied to each vector memory 304. Though FIG. 3 shows the data distribution for one series of input data, the vector distributor 103 receives two series of input data as shown in FIG. 1. That is, the vector distributor comprises two such circuits.

This vector distributor 103 continuously reads input vector data such as image data stored outside the program controlled processor, and distributes the data to each vector processing unit 102-1–102-n as block vectors comprising an equal number of data units in a format for parallel processing.

Figure 4:
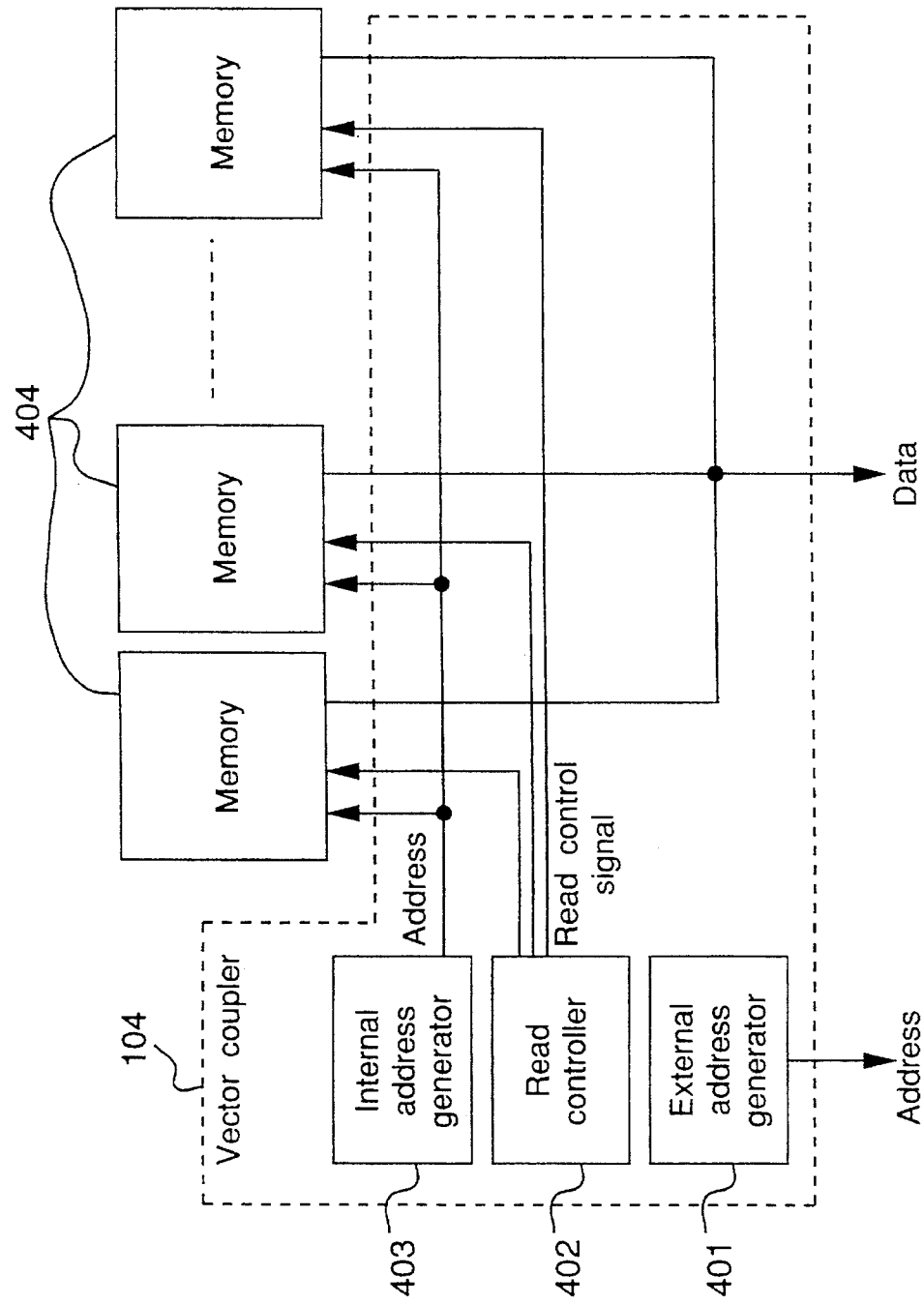
FIG. 4 is a block diagram of a vector coupler in FIG. 1.

FIG. 4 shows an example of a configuration of the vector coupler 104. The vector coupler 104 simultaneously reads the block vectors stored in the vector memories 404 in the vector processing units 102-1–102-n at addresses output by the internal address generator 403. Memory reading is controlled by the read controller 402, and the read block vectors as well as the address generated by the external address generator 401 are then output sequentially.

Figure 5:
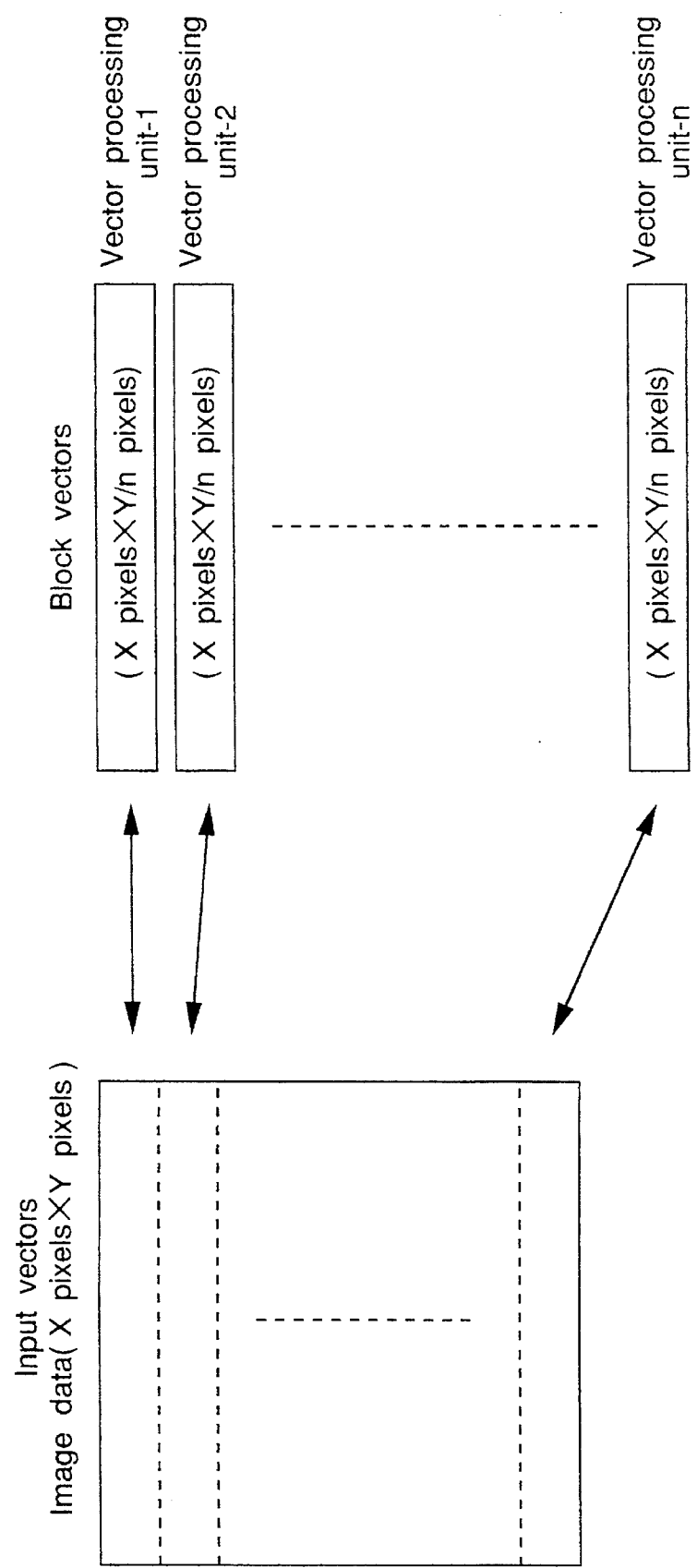
FIG. 5 illustrates vector distribution/coupling operations in the program controlled processor in FIG. 1.
Figure 14:
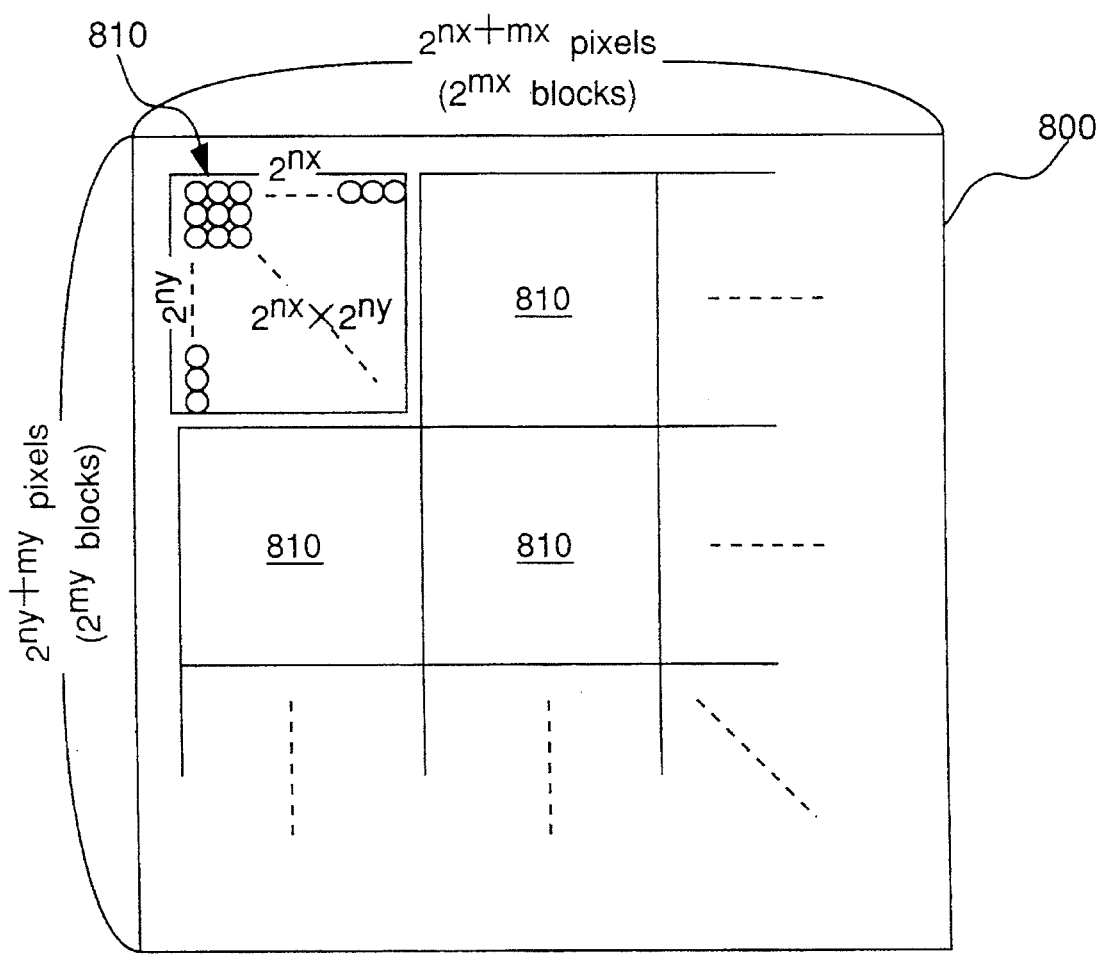
FIG. 14 illustrates an image signal processed by a address generator according to the present invention.

FIG. 5 illustrates a concept of the operation of the vector distributor 103 and vector coupler 104. The input vectors are image data of X×Y pixels. If the program controlled processor comprises n vector processing units 102-1–102-n, the vector distributor 103 divides the image data in a vertical direction into n blocks, and stores image data of X×(Y/n) pixels as block vectors in the vector memories 304 of the vector processing units 102-1–102-n. Opposite to this distribution process, the vector coupler 104 stores the block vectors of X×(Y/n) pixels as output vectors of X×Y pixels image data in the format of the source image data in the vector memories 404 of the vector processing units 102-1–102-n. It is to be noted that while the distribution/coupling method shown in FIG. 5 divides the image data in a vertical direction, various other methods such as rectangular block distribution/coupling can be used for an application. FIG. 14 to be explained later shows division of image data into rectangular blocks.

The program controlled processor shown in FIG. 1 has parallel instructions including parallel vector instructions in addition to the instructions of a conventional processor. A parallel instruction is an instruction which operates the vector processing units 201-1–201-n identically in parallel. If an instruction interpreted and executed by the decoder 107 is a parallel instruction the same operations are processed by the vector processing units 102-1–102-n. That is, the decoder 107 outputs the same control signal to all of the vector processing units 102-1–102-n, which therefore execute the same processing. On the other hand, if the instruction is not one of the parallel instructions, the scalar processing unit 101 is operated. That is, the decoder 107 outputs a control signal to the scalar processing unit 101 for data processing. Whether the instruction is a parallel instruction or not is determined by the instruction bit map. For example, bit 1 of the bit map can be used as a control bit for the instruction discrimination.

Figure 6B:
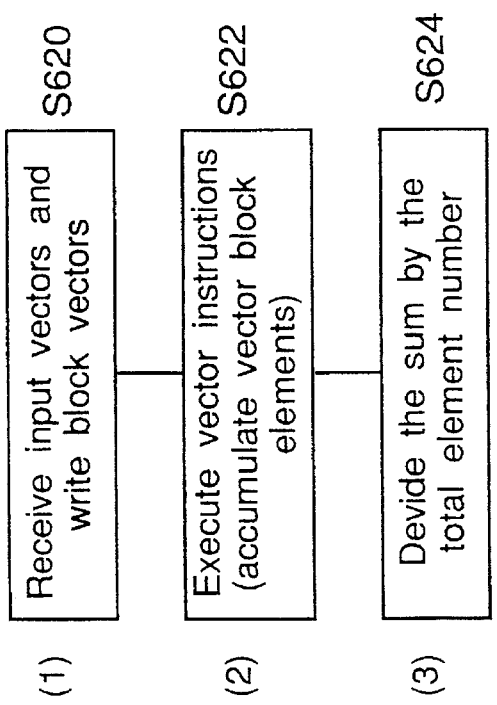
FIGS. 6(a) and 6(b) are flowcharts illustrating the operation of the program controlled processor shown in FIG. 1.
Figure 6A:
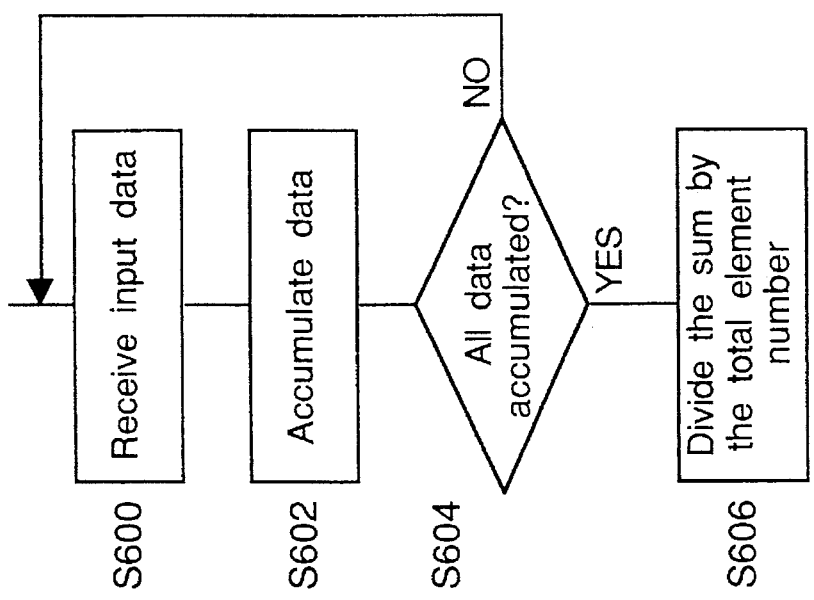

FIGS. 6(a) and 6(b) show flows for calculating an average of image data in prior art program controlled processors. As shown in FIG. 6(a), in a prior art processor, data input and accumulation processes are executed the same number of times, and the sum is then divided by the number of data. As shown in FIG. 6(b), in another prior art processor, vector instructions on vector input and accumulation are executed. That is, a vector instruction on the accumulation of elements of vector blocks is executed. The result of the accumulation is then divided by the number of data elements.

Figure 7B:
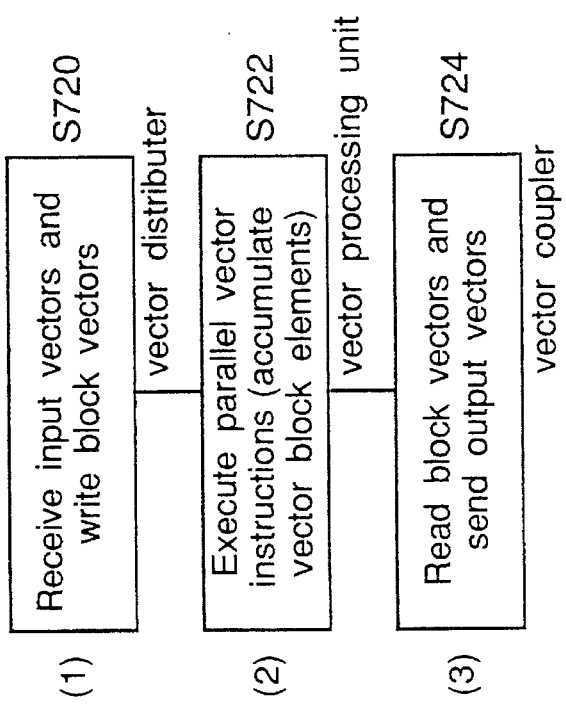
FIGS. 7(a) and 7(b) are flowcharts illustrating the operation of a conventional program controlled processor.
Figure 7A:
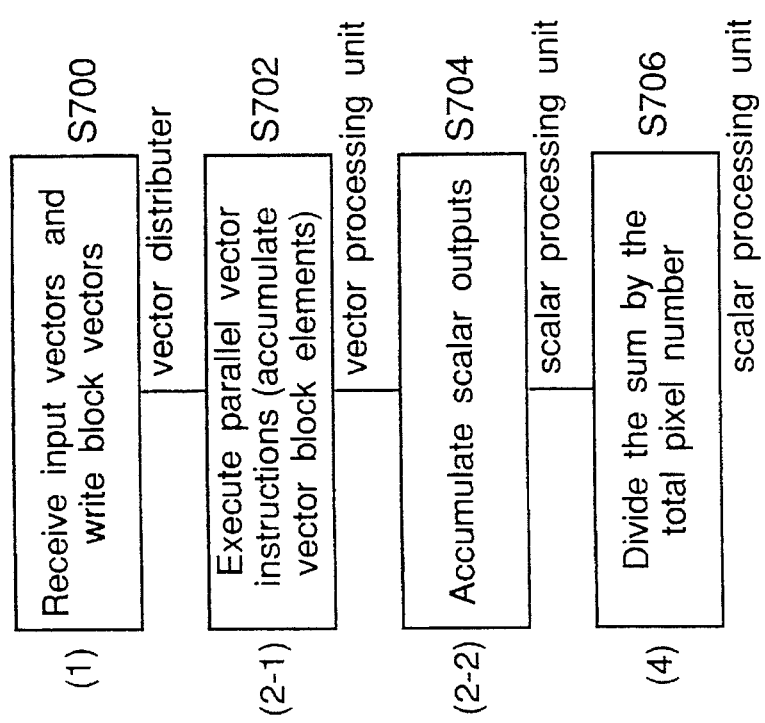

FIGS. 7(a) and 7(b) show examples of flows executed by the processor of the present embodiment. The accumulation is performed in the flow shown in FIG. 7(a), while the difference of two image data elements is calculated by the flow shown in FIG. 7(b).

In the flow shown in FIG. 7(a), the processor continuously writes pixel data as the image data vectors in the vector memory 304 in each vector processing unit 102-1–102-n through the vector distributor 103 (step S700). Data of the same number of pixels are stored in the vector memory 304 of each vector processing unit 102-1–102-n. A parallel vector instruction is then executed by the vector processing units 102-1–102-n to compute the total scalar sum of the vector elements by using the block vectors distributed as source data to the memories 304 of the vector processing units 102-1–102-n (step S702). The parallel vector operation executed at this step is the calculation shown in Equation (3). A next step is not executed until the parallel vector instruction is completed. When the parallel vector instruction is completed, the sums of the elements of all of the block vectors are sequentially added by the scalar processing unit 101 because the sums have been stored in the scalar registers 206 in the vector processing units 102-1–102-n (step S704). By dividing the total sum by the total number of the pixels by the scalar processing unit 101, the average of the input image data is obtained (step S706).

In FIG. 7(b), first, data of the pixels of the two series of image data are continuously input as vectors and written in the memories 304 in the vector processing units 102-1–102-n by the vector distributor 103 (step S720). The distribution at this step stores the same number of pixels in the memories 304 of the vector processing units 102-1–102-n. The vector processing units 102-1–102-n then execute a parallel vector instruction to compute a difference vector (the difference of the elements) of the block vectors by using the block vectors distributed to the memories 304 in the vector processing units 102-1–102-n as two source data, and by storing the result in the vector memories 404 in the vector processing units 102-1–102-n (step S722). When the parallel vector instruction is completed, the vector coupler 104 reads and converts the computed difference vectors stored in the vector memories 404 in the same format as the input image data, and the result is an output (step S724).

FIG. 8 shows a timing chart on processing times in the examples of the processing of the calculation of an average shown in FIG. 6(a) and 6(b) of the above-mentioned prior art processors and in the processor of the first embodiment for comparison. The top chart in FIG. 8 corresponds to the processing shown in FIG. 6(a), wherein a data on each pixel is processed sequentially and then an average is calculated. Therefore, the accumulation is performed a number of times correspond to the number of pixel data elements. The middle chart in FIG. 8 corresponds to the processing shown in FIG. 6(b). First, input vectors are received and block vectors are written in a portion denoted as (1). Next, vector instructions are executed for accumulation in a portion denoted as (2). The processing time of this portion is roughly proportional to the number of vector elements. Therefore, the processing time of this case is shorter than that in the top chart. Finally, an average is calculated in a portion denoted as (3). The bottom chart in FIG. 8 corresponds to the processing shown in FIG. 7(a). First, input vectors are received and block vectors are written in a portion denoted as (1). The processing time of this portion is the same as the counterpart of the middle chart. Next, a parallel vector instruction is then executed by the vector processing unit 102 in parallel to accumulate vector block elements in a portion denoted as (2-1). Then, the sums of the elements of all block vectors are sequentially added by the scalar processing unit 101 in a portion denoted as (2-2). Finally, an average is calculated in a portion denoted as (3). The processing time of this portion is the same as the counter part in the middle chart. However, the execution time in the portions (2-1) and (2-2) is short because the vector operation is performed in parallel in the vector processing units 102-1–102-n. Therefore, it is obvious from this timing chart that execution time is significantly reduced in the present invention and the performance is improved by using the program controlled processor of the present invention.

In addition, because the output data of the vector memories 404 of the vector processing units 102-1–102-n used for output in the processor of the first embodiment are sent again to the vector processor 200, the result of a parallel vector instruction can be used as an input for a next parallel vector instruction. In effect, by combining parallel vector instructions with normal instructions, the requirements of complex applications may be satisfied.

As described above, the program controlled processor of the first embodiment easily achieves data distribution for parallel processing to shorten the processing time by combining the plural vector processing units with the vector distributor and the vector coupler. It significantly improves performance for example in an image processing application which can be operated in parallel processing by using an image division technique.

FIG. 9 is a block diagram of a program controlled processor according to a second embodiment of the invention. The vector processing units 102'-1–102'-n of this embodiment are identical as those of the first embodiment except that each of vector memories 1001, 1002, 1003, 1004 storing block vectors in each vector processing unit 102'-1–102'-n are constructed as a double buffer. A vector distributor 103' and a vector coupler 104' (FIG. 9) also operate differently from the vector distributor 103 and the vector coupler 104 in the first embodiment. When a start instruction is executed, vectors can be transferred independently of the sequencer 106 and decoder 107.

As shown in FIGS. 10(a) and 10(b), respectively, the input and output side configurations of the double buffer vector memory include vector memories 1001, 1002, 1003 and 1004 and selectors 1005, 1006, 1007, 1008, 1009, 1010 and 1011. (In FIG. 10(a), only one of the memories 1001 and 1002 are shown.) The selectors 1005 and 1006 select between data from the vector distributor 103' and data from the vector processing unit 102' to be sent to the memory 1001, 1002, while the selector 1007 selects between data from the memory 1001 and data from the other memory 1006 to be sent to a vector processor 200' in the vector processing unit 102'. Similarly, the selectors 1008 and 1009 select between data from the vector processing unit 102' and data from the vector coupler 104' to be sent to the memory 1003, 1004, while the selectors 1010 and 1011 select between data from the memory 1010 and data from the other memory 1011 to be sent to the vector coupler 104' and to the other vector processor 200' in the vector processing unit 102'.

Referring to FIGS. 10(a) and 10(b), when a block vector transfer between one of the vector memory 1001, 1003 and the vector processor 200 is enabled during a certain period by the selector 1005–1011 (or when the vector processor 200 has access privileges), the other vector memories 1002, 1004 are exclusively controlled to enable communication with the vector distributor 103' or vector coupler 104' (the vector distributor 103' or vector coupler 104' has access privileges). In other words, access privileges are exchanged when a period ends. A specific internal instruction or external synchronization signal is used to control the access privilege exchange.

The processor shown in FIG. 9 performs vector input, operation processing, including vector operations, and vector output operations in parallel pipeline processing. This processing is explained below with reference to the timing chart shown in FIG. 11. It is to be noted that to process results shown in FIG. 11 are obtained by applying to plural input vectors a processing which results in a vector as shown in the above-mentioned second example.

Figure 11:
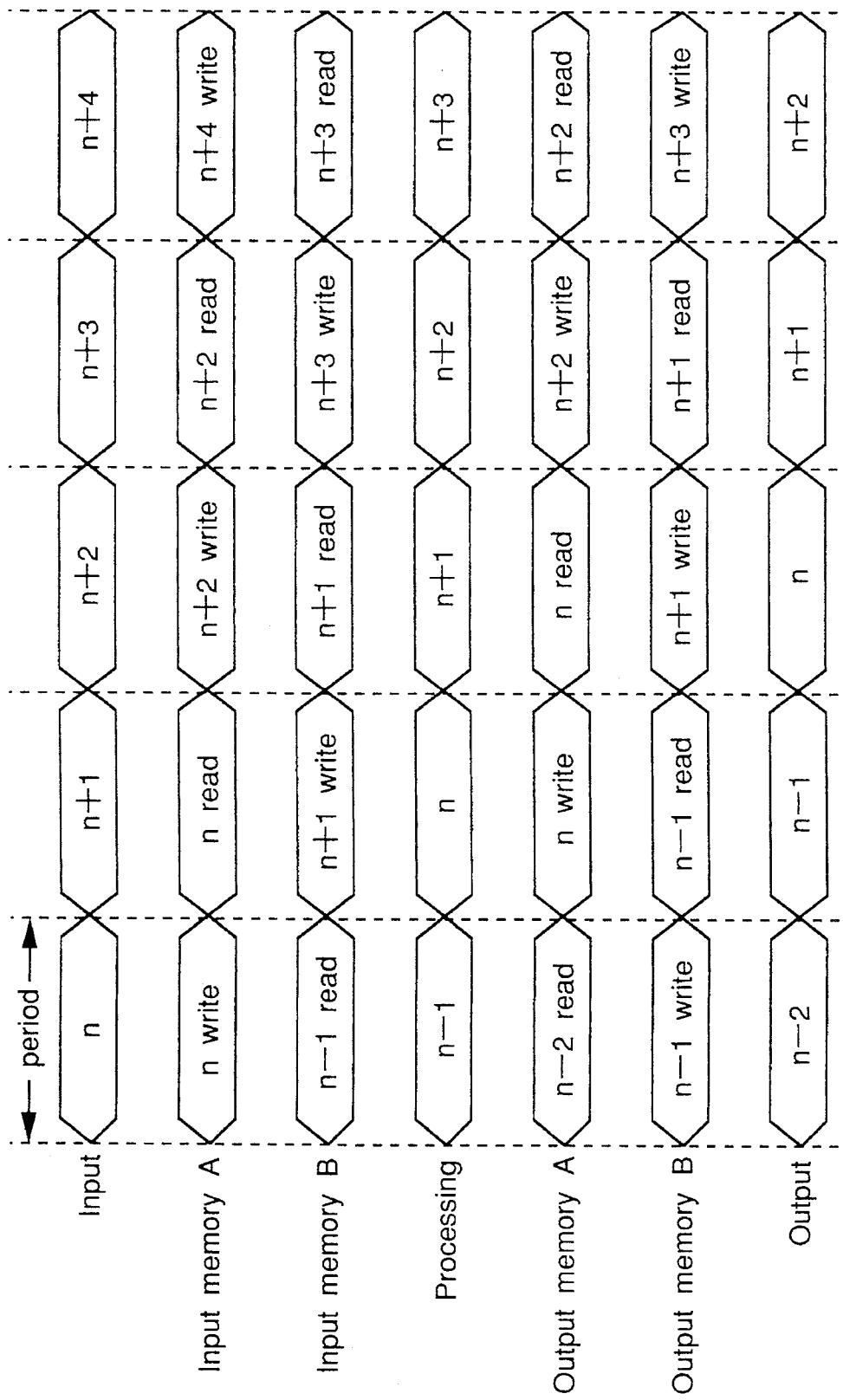
FIG. 11 is a timing chart used to describe the operation of the program controlled processor shown in FIG. 9.

As will be apparent in FIG. 11, an n-th input data is processed in a period by the vector processor 200' while reading the n-th input from one of the input memories 1001, 1002 and writing the result of the processing in one of the output memories 1003 and 1004. In the same period, an (n+1)-input is input and written in the other of the input memories while an (n−1)-th result is read in the other of the output memories and output. In other words, the processor shown in FIG. 9 executes the transfer of the input/output of vectors and the operation of vectors in parallel. Therefore, operations of the processor in portions denotes as (1), (2-1), and (2-2) in FIG. 8 are processed in pipeline processing, thus further improving operation efficiency. As a result, the processor can be used for motion picture processing applications requiring real-time processing.

It is to be noted that while the above-mentioned second embodiment uses a double buffer vector memory, the present invention remains valid for a vector memory which comprises any number of buffers.

As explained above, the program controlled processor according to the second embodiment further improves performance by using a plural buffer structure for the memories in the vector processing units, and by operating the sequencer independently of data input/output.

Figure 12:
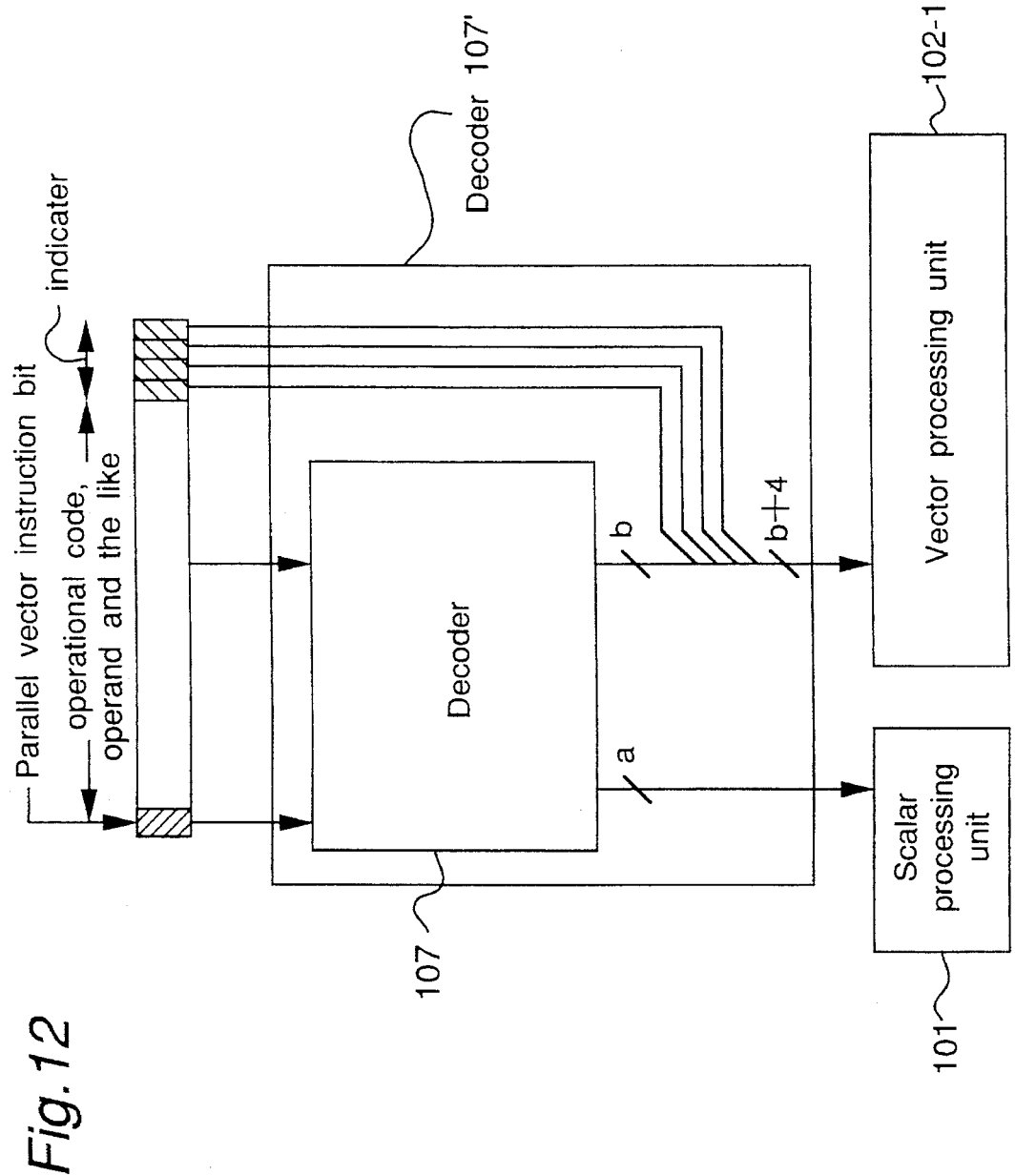
FIG. 12 is a block diagram of the decoder used in a third embodiment of a program controlled processor according to the present invention.

FIG. 12 shows a concept of a decoder used in a third embodiment of a program controlled processor according to the present invention. The processor is similar to that of the first embodiment explained above except for the decoder control.

The processor of the third embodiment has a control indicator in an instruction code of the parallel vector instructions to indicate which of the plural vector processing units 102-1–102-n are to be operated. For example, in a program controlled processor comprising four vector processing units (n=4), four bits is assigned as a control indicator in an instruction code in the machine language. Each bit of the 4-bit control indicator corresponds to one of the four vector processing units and the setting of a bit means that the corresponding vector processing unit is operated. For example, "1" or "0" is set to operate or not to operate the vector processing unit. Some examples are shown in Table 1. Note that "o" indicates operation of vector processing unit, while "x" indicates non-operation thereof.

TABLE 1

| Indicator | Control indicator | | | |
|---|---|---|---|---|
| | Unit 1 | Unit 2 | Unit 3 | Unit 4 |
| 1000 | o | x | x | x |
| 0100 | x | o | x | x |
| 1010 | o | x | o | x |
| 1110 | o | o | o | x |
| 1111 | o | o | o | o |

In FIG. 12, the lowest four bits in an instruction code read by the sequencer 106 (FIG. 1) are used as the above-mentioned control indicator, and the decoder 107' directly sends these bits as an operation enable signal to a corresponding vector processing unit 102 besides a control signal instructing the content of an operation to be executed. Thus, each vector processing unit 102 determines whether or not to operate by evaluating the status of the operation enable signal in an instruction code. The control to stop the processing of the vector processing unit is performed, for example, by stopping the clock governing pipeline operations so that all of the state changes are prevented.

The processor of the third embodiment applies the same control to all n vector processing units. If the application can divide the input vectors not into n parts for parallel processing, but into m parts (where n>m), the program controlled processor according to the third embodiment of the present invention can prohibit operation of a selected number of vector processing units based on the number of parallel processes executable by the application. Then, the total power dissipation can be reduced because excess vector processing units are not operated.

Figure 13:
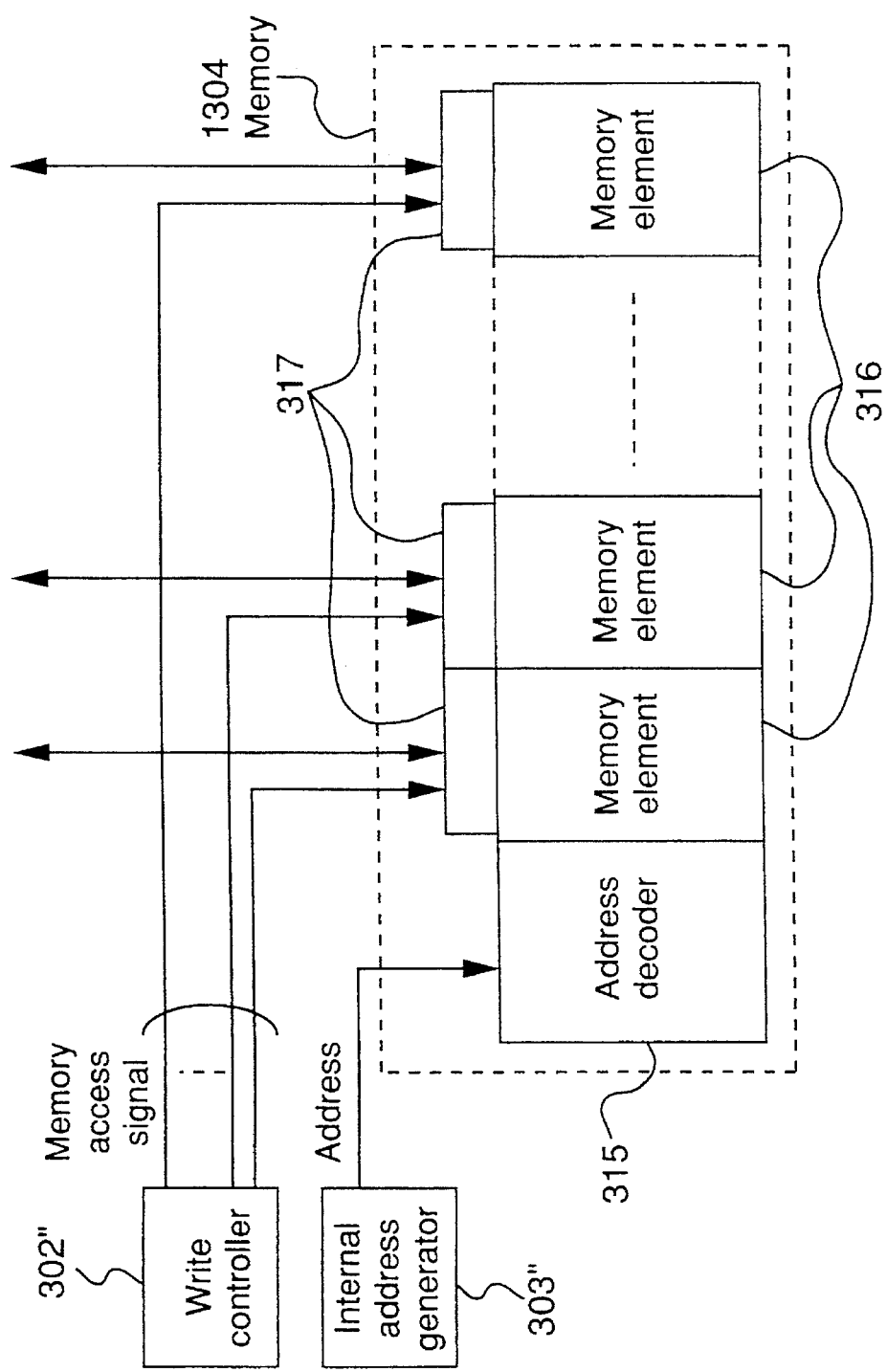
FIG. 13 is a block diagram of a program controlled processor according to a fourth embodiment of the present invention.

FIG. 13 shows a memory configuration of the program controlled processor of a fourth embodiment of the present invention. The configuration of the vector memory 1303 in the vector processing units shown in FIG. 13 differs from that of the vector memories 304 in the first embodiment (refer FIG. 3). The vector memories 304 shown in FIG. 3 are conventional memory devices each comprising an address decoder and a memory element. On the other hand, the memory 1304 comprises an address decoder 315, n memory elements 316 and n controllers 317 for controlling whether a block vector is read or written, wherein each of the memory elements 316 denotes a vector memory included in each of n vector processing units. The controllers 317 uses the above-mentioned control indicator adopted in the third embodiment to control which of the vector processing units 102-1–102-n are operated. A memory access signal generated by a write controller 302 is supplied to a relevant controller 317, while an address signal generated by an external address generator 303 is supplied only to the address decoder 315 as an address.

As shown in FIG. 1, a vector processing unit 102-1–102-n comprises two memories 304 for input vector data and one memory 404 for output vector data. The configuration shown in FIG. 13 only illustrates a set for one of the two memories 304, and another such configuration is also provided for the other of the two memories 304 for the other series of input data. Further, a similar memory configuration is provided for n memories 404 for outputting vector data, though not shown explicitly.

An advantage of the vector memory structure shown in FIG. 13 is that any selected block vectors can be simultaneously written/read by using the single address decoder 315. When parallel processing in m divisions (n>m) is operated, the extra memory elements are not operated. This reduces power dissipation and also reduces the space required for the memories because only one address decoder is provided.

In the program controlled processors of the embodiments explained above, data is distributed or coupled for parallel vector processing to or from memories in the n vector processing units 102-1–102-n. Next, address generators for distributing or coupling data are explained in detail.

FIG. 14 illustrates an image signal to be processed wherein values nx, ny, mx and my of natural numbers are defined. An image signal 800 relates to a rectangular image area of $(2^{nx+mx}) \times (2^{ny+my})$ pixels and is divided into a plurality of image signals 810 of rectangular blocks each comprising $(2^{nx}) \times (2^{ny})$ pixels. The location of a pixel in a block is defined by nx and ny, while the location of a block is defined by mx and my. Each of these block image signals 810 is stored in one memory element in a vector processing unit 102-1–102-n. Therefore, the number of memory elements used for the memories 304 or 404 is $(2^{mx+my})$. Preferably, a program controlled processor comprises an address selector for designating an i-th line ($1 \leq i \leq n$) in a block vector data 810 as a matrix and a memory address selector for designating a j-th column ($1 \leq j \leq m$) in a matrix of the memories.

Figure 15:
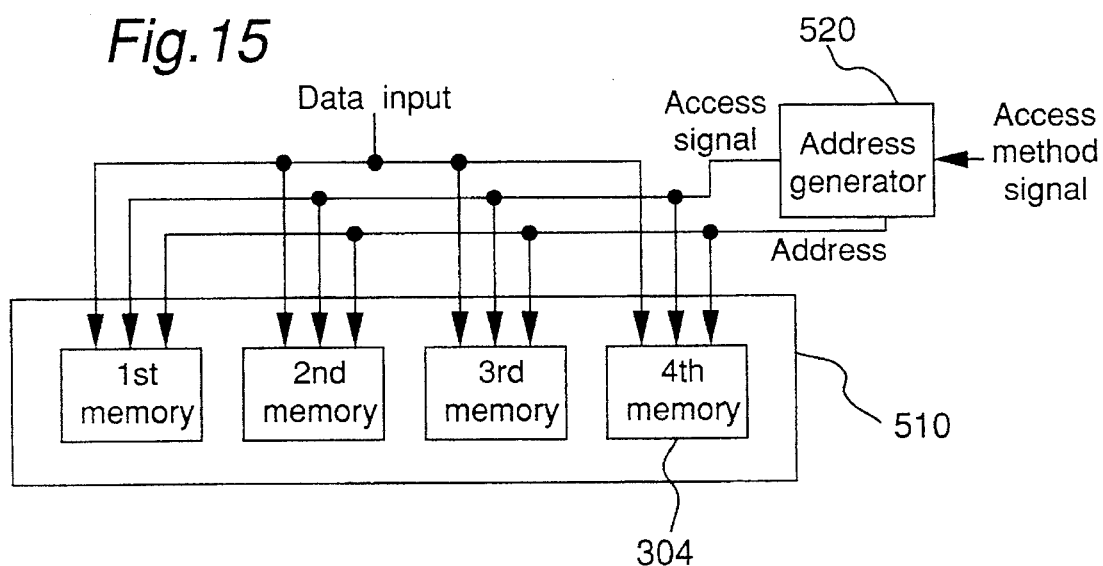
FIG. 15 is a block diagram of address generators of fifth and sixth embodiments according to the present invention.
Figure 16:
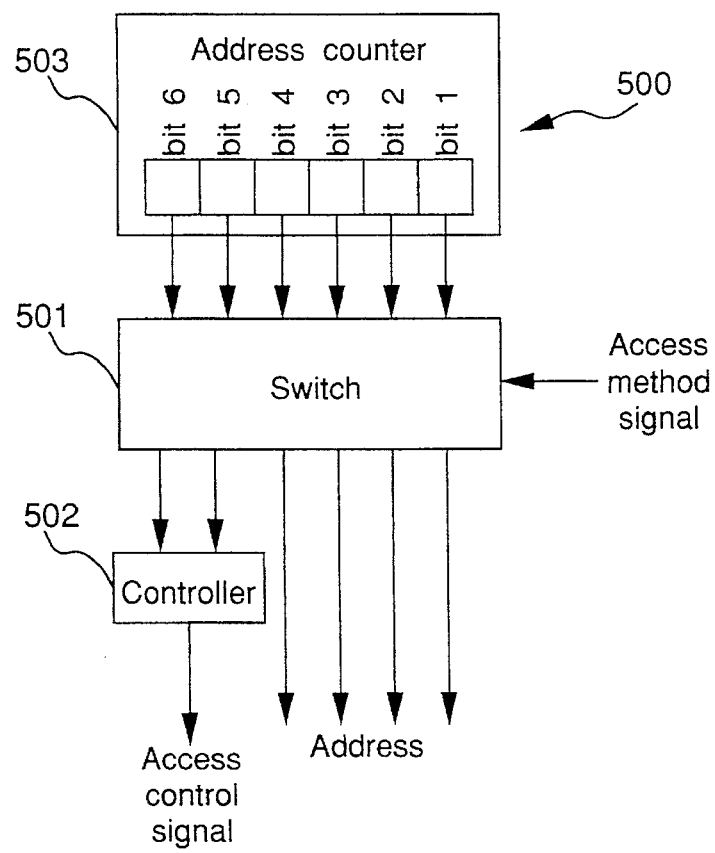
FIG. 16 is a block diagram of an access controller in the fifth embodiment of memory control according to the present invention.
Figure 17:
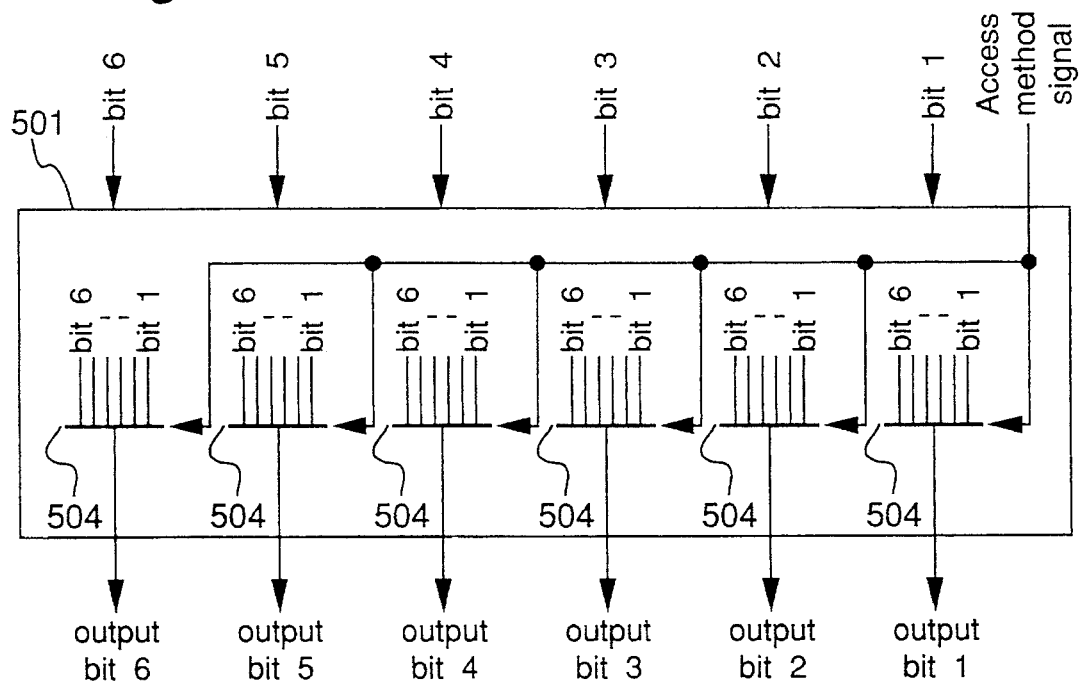
FIG. 17 a block diagram of a switch circuit in the fifth embodiment of memory control according to the present invention.

FIGS. 15–17 show an example of a fifth embodiment of the present invention including an address generator 520 for writing or reading $(2^{nx} \times 2^{ny})$ of $(2^{nx} \times 2^{ny} \times 2^{mx} \times 2^{my})$ data to or from $(2^{mx} \times 2^{my})$ memory elements 304 and 404. The address generator 520 corresponds to an internal address generator 501, 403 or 403', and it comprises an (nx+ny+mx+my)-bit address counter 503 and a switch circuit 501 and an access controller 502. The switch circuit 501 changes the order of the (nx+ny+mx+my) bits of an output signal of the address counter 503 according to an access method signal. The switch circuit 501 can select any of the bits, but the access method signal is set so that the same bits are not output from the switch circuit 501. The sequence or data access performed by the switch circuit 501 is controlled according to an access method signal. The access method signal designates for example a block scan or a raster scan as shown in FIGS. 19(a) and 19(b). When data access begins, the address counter 503 counts data accesses and bit 1 to (nx+ny) of the switch circuit 501 are output as an address in a block commonly to (nx+ny) address pins of the $(2^{mx} \times 2^{my})$ memory elements 304 and 404, while (mx+my) bits from bit (nx+ny+1) to (nx+ny+mx+my) of the switch circuit 501 are sent to the access controller 502 for locating a block to be accessed. Thus, an address is generated continuously. The bit (nx+1) to (nx+ny) received by the memories select an i-th line ($1 \leq i \leq ny$) in each block vector data as a matrix as shown in FIG. 14. The access controller 502 receiving bits (nx+ny+1) to (mx+my+nx+ny) generates memory access signals. The access controller 502 sends memory access signals to the $(2^{mx} \times 2^{my})$ memory elements 304 and 404. That is, the access controller 502 can select a memory in a matrix of the memories. Then, the memories can be accessed according to a designated scan method.

Preferably, the memory access method signal designates either block access or raster scan access, and the switch circuit 501 preferably comprises i address selectors ($1 \leq i \leq ny$) for selecting bit (nx+i) for block access or bit (nx+mx+i) for raster scan access, and j memory address selectors ($1 \leq j \leq mx$) for selecting bit (nx+ny+j) for block access or bit (nx+j) for raster scan access, wherein i and j are natural numbers. The first to nx-th bits of the address counter are output to the first to nx-th address pins of the memories, while the outputs of the i address selectors are supplied to (nx+1)-th to (nx+ny)-th address pins of the memories to select a horizontal line in a block memory data. The outputs of the j memory address selectors designates the j-th columns in the matrix of the memories, while bits (nx+ny+mx+1) to (nx+ny+mx+my) designates the lines in the matrix of the memories. The access controller 560 generates memory access signals from the outputs of the j memory address selectors and bits (nx+ny+mx+1) to (nx+ny+mx+my) so as to indicate a memory to be accessed.

An example of the fifth embodiment is described below with reference to FIGS. 15, 16 and 17, wherein mx+my= 2 and nx+ny=4 or sixteen data elements are stored in each of four memories. An address generator 520 is used for data input in a program controlled processor comprising four vector processing units 102-1 to 102-4. As shown in FIG. 15, the address generator 520 controls a memory 510 including four memory elements 304 according to an access method signal. The address generator 520 sends an access signal and an address according to the access method signal to the four memories in the memory 510. Thus, input data is stored successively in the four memories. As shown in FIG. 16, the address generator 520 comprises a switch circuit 501, a controller 502 and a 6-bit address counter 503. The switch circuit 501 receives a 6-bit value of a data count counted by the address counter 503 and sends it as an access control signal and as an address. FIG. 17 is a block diagram of the switch circuit 501 shown in FIG. 16. The switch circuit 501 comprises six address selectors 504 for selecting data according to the access method signal.

The operation of this embodiment is described below in an example wherein the values mx=2, my=0, nx=1 and ny=3. The switch circuit 501 can select any bit as shown in FIG. 17, but the selected bits are controlled according to the access method signal and the same bits are not output from the switch circuit 501. Specifically, each address selector 504 is first set by means of the access method signal.

If the access method signal designates a raster scan mode, bit 1 of address counter 503 is output bit 1, bit 2 is output bit 5, bit 3 is output bit 6, bit 4 is output bit 2, bit 5 is output bit 3, and bit 6 is output bit 4. In other words, address counter bit 1 and the three high bits 4–6 (total four bits) are output to each memory as an address, while address counter bits 2 and 3 (total two bits) are output to the access controller 502. When data input/output (I/O) begins, the address counter 503 counts the number of data accesses, and the I/O data is written to the memory specified by the controller 502. In the example where mx=2, my=0, nx=1 and ny=3, the first two data elements are written in the first memory where the data access count of the address counter 503 are "000000" and "000001"; the third and fourth data elements (two data elements) are written in the second memory where the data access count of the address counter 503 are "000010" and "000011"; the fifth and sixth data elements (two data elements) are written in the third memory where the data access count of the address counter 503 are "000100" and "000101"; and the seventh and eighth data elements (two data elements) are written in the fourth memory where the data elements access count of the address counter 503 are "000110" and "000111". The ninth and tenth data elements (two data elements) are then written in the first memory because the bits 3 and 2 in the data count returns to "00" again. This sequence is continued by writing two data elements in a memory and then by advancing to the next memory. Thus, for $(2^1 \times 2^3 \times 2^2 \times 2^0)$ data elements, it is possible to write $(2^1 \times 2^3)$ data to each of $(2^2 \times 2^0)$ memories. It is to be noted that this example can be easily expanded for an address generator for storing $(2^{nx} \times 2^{ny})$ elements of $(2^{nx} \times 2^{ny} \times 2^{mx} \times 2^{my})$ elements data in $(2^{mx} \times 2^{my})$ memories.

As described above, the parallel processing technique is essential to accelerate image processing applications, and the address generator of the present embodiment can distribute/couple $(2^{nx} \times 2^{ny} \times 2^{mx} \times 2^{my})$ data elements of a rectangular area data input/output to/from the $(2^{mx} \times 2^{my})$ memories by using a small scale circuit. Furthermore, this can reduce the number of address pins as required, and the cost also drops as the number of pins decreases. Because power dissipation by the input/output pins accounts for a relatively large percentage of total power dissipation of the device, the power dissipation and power supply requirements of the device can be decreased by decreasing the pin number.

Next, an address generator 521 according to a sixth embodiment of the present invention is explained for writing or reading ($2^n \times 2^n$) elements of ($2^n \times 2^n \times 2^m \times 2^m$) data elements to and from ($2^m \times 2^m$) memory elements to process an image signal of a square image area, wherein m and n are natural numbers. The values of m and n of this memory image corresponds to a case where mx=my=m, and nx=ny=n of the image shown in FIG. 14. The address generator 521 is used for an image of $2^{n+m}$ by $2^{n+m}$ pixels which can be divided into plural image signals representing square image blocks of $2^n$ by $2^n$ pixels, each block image signal being stored in a memory. However, the memory access sequence of the sixth embodiment differs from that of the fifth embodiment.

The address generator of the sixth embodiment comprises an (n+n+m+m)-bit address counter 530, i address selectors (1≤i≤n) for selecting bit (n+i) for block access or bit (n+m+i) for raster scan address, and j memory address selectors (1≤j≤m) for selecting bit (n+n+j) for block scan or bit (n+j) for raster scan access, and an access controller 560 for generating memory access signals to be sent to the memories to designate a memory to be accessed, wherein i and j are natural numbers. The outputs of the i address selectors are supplied to (n+1)-th to (n+n)-th address pins of the memories to select a horizontal line in a block memory data, while the j memory address selectors selects a vertical memory column in a matrix of the memories. The access controller 560 generates memory access signals. The j memory address selectors select bit (n+n+j) when the access signal selects bit (n+i) based on the selection by the i address selectors, and selects bit (n+j) when bit (n+m+i) is selected by the i address selectors. When data access begins, the address counter 530 counts data accesses, and bits 1 to n of the address counter 530 and the i address selector outputs are output as an address to the $2^{2 \times m}$ memory elements, while the j memory address selector outputs and bits (n+n+m+1) to (n+n+m+m) of the address counter 530 are input to the access controller 560. The access controller 560 outputs an access signal to $2^{2 \times m}$ memory elements.

Figure 18:
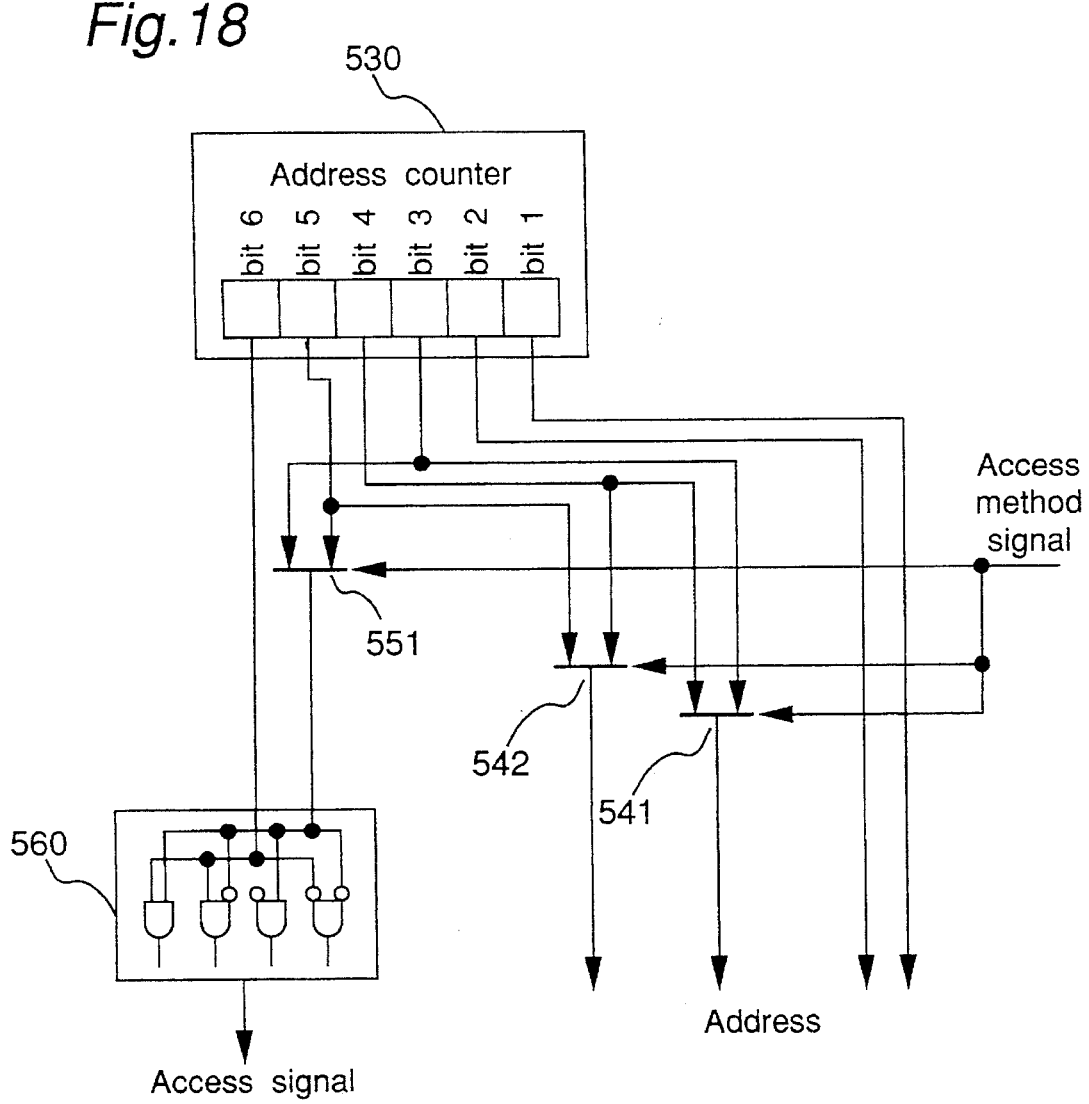
FIG. 18 is a block diagram of an address generator of a sixth embodiment according to the present invention.

An example of the sixth embodiment where m=1 and n=2 is described below with reference to FIG. 18 of a block diagram of an address generator for a program controlled processor including four vector processing units. The address generator is used in the circuit shown in FIG. 15 instead of the address generator 520. As shown in FIG. 18, the address generator comprises a 6-bit address counter 530, a first address selector 541 for selecting bit 3 or 4, a second address selector 542 for selecting bit 4 or 5, a memory address selector 551 for selecting bit 5 or 3, and an access controller 560.

The operation of the example is described below. In the example, sixteen data elements are stored in each of four memories. FIGS. 19(a) and 19(b) illustrate two main access methods: input in block units (FIG. 19(a)) referred to as "block access" hereinafter, and raster scan access spanning a plurality of blocks (FIG. 19(b)) referred to as "raster scan access" hereinafter. FIG. 20(a) shows input sequence of data in the block access mode. The areas marked "1st memory", "2nd memory", "3rd memory", and "4th memory" indicate the period wherein data is written in the first to fourth memory elements. Thus, in the block access mode, data is accessed in the unit of block image area consecutively. On the other hand, FIG. 20(b) shows input sequence of data in the raster scan access mode wherein "1" indicates the first memory is selected by the access signal; "2", "3", and "4"

similarly indicate selection of the corresponding memory elements. Thus, data is accessed along a horizontal line consecutively.

The access method signal is used to select which of the two access methods is used. Block access (FIG. 19(a)) is used when bit 3 is selected by the first address selector 541, bit 4 by the second address selector 542, and bit 5 by the memory address selector 551, while raster scan access (FIG. 19(b)) is used, when bit 4 is selected by the first address selector 541, bit 5 by the second address selector 542, and bit 3 by the memory address selector 551.

When block access is specified by the access method signal, the first address selector 541 selects bit 3, the second address selector 542 selects bit 4, and the memory address selector 551 selects bit 5. In other words, the selectors 541, 542 and 551 are set so that the lowest four bits of the address counter 530 are input as an address to each memory element in the memory 510, and the fifth and sixth bits of the address counter 530 are input as an memory address signal to the access controller 560. When data input/output begins, the address counter 530 counts the number of data accesses, and the fifth bit of the address counter 530, which is the output of the memory address selector 551, and the highest bit of the address counter 530 are decoded by the access controller 560 to be sent to the memory elements in the memory 510 as the memory access signals together with the input data. Thus, sixteen data elements are stored continuously in a memory element, and input data is stored in the four memory elements successively.

When raster scan access is designated by the access method signal, the first address selector 541 selects bit 4, the second address selector 542 selects bit 5, and the memory address selector 551 selects bit 3. In other words, the selectors 541, 542 are set so that the lowest two bits and bits 4 and 5 of the address counter 530 are input to each memory element of memory 510 as an address, and the bits 3 and 6 of the address counter 530 are input as an memory address to the access controller 560. When data input begins, the address counter 530 counts the number of data inputs, and the bit 3 of the address counter 530, which is the output of the memory address selector 551, and the highest bit of the address counter 530 are decoded by the access controller 560 and input to the memory elements of the memory 510 as memory access signals together with the input data. In the raster scan, four successive data elements are stored in the first memory for address counts of "000000" to "000011". Then, for the address count of "000100", the memory access signal is changed from "00" to "01", and next four data elements for address counts of "000100" to "000111" are stored in the second memory. Next, for the address count of "001000", the memory access signal is changed from "01" to "00", and next four data elements for address counts of "001000" to "001011" are stored in the first memory. This processing is continued for the raster scan. Thus, for ($2^2 \times 2^2 \times 2^1 \times 2^1$) data elements, it is possible to write ($2^2 \times 2^2$) data elements into each of ($2^1 \times 2^1$) memories.

Note that this example can be easily expanded as described above as an address generator for writing/reading ($2^n \times 2^n$) of ($2^n \times 2^n \times 2^m \times 2^m$) data elements to and from ($2^m \times 2^m$) memories.

As described above, the address generator the present embodiment can distribute/couple the ($2^{n+m} \times 2^{n+m}$) data elements of a square area data input/output to/from ($2^m \times 2^m$) memories by using either block access or raster scan access by using a small scale circuit. Therefore, this can reduce the number of address pins required, and the cost drops as the number of pins decreases. Because power dissipation by the input/output pins accounts for a relatively large percentage of total power dissipation of an LSI device, reduction of the number of pins also reduces the power dissipation and power supply requirements of the device.

In processing square data areas as frequently used in image processing, the address generator according to the sixth embodiment can distribute/couple data inputs/outputs in a ($2^{n+m} \times 2^{n+m}$) area to ($2^m \times 2^m$) memory elements by means of a counter and a number selector. Either block access or raster scan input/output methods can be selected by providing one selector.

Next, an address generator according to a seventh embodiment of the present invention is explained. The address generator can control the number of memory elements to be operated is stored by adding only a small scale circuit to the address generator of the sixth embodiment. Then, the data access time is halved when the number of blocks to be processed is less than one half of ($2^m \times 2^m$), or less than ($2^m \times 2^{m-1}$), thus achieving high speed data input/output.

Figure 21:
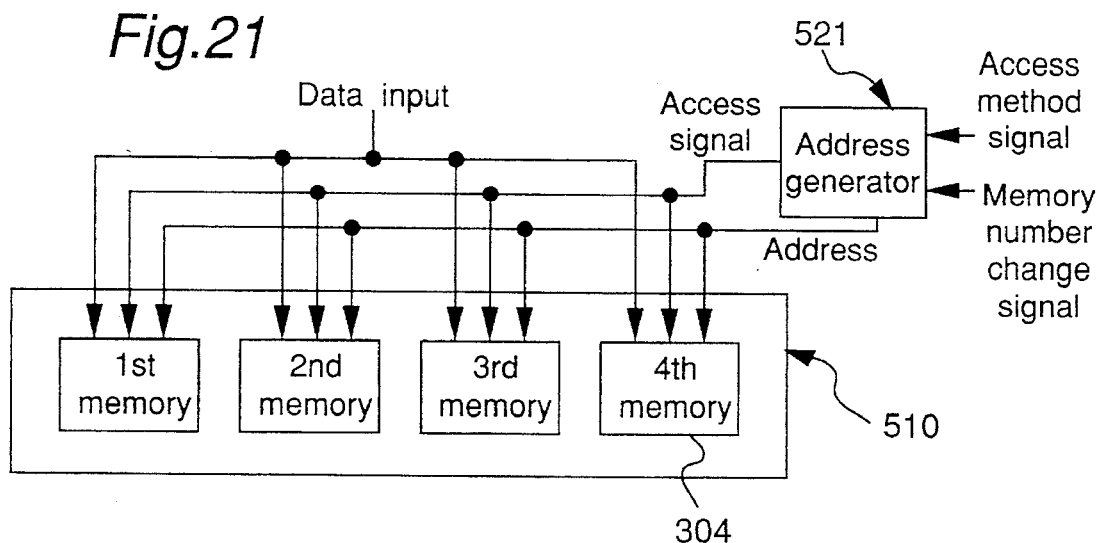
FIG. 21 is a block diagram of an address generator of a seventh embodiment according to the present invention.
Figure 22:
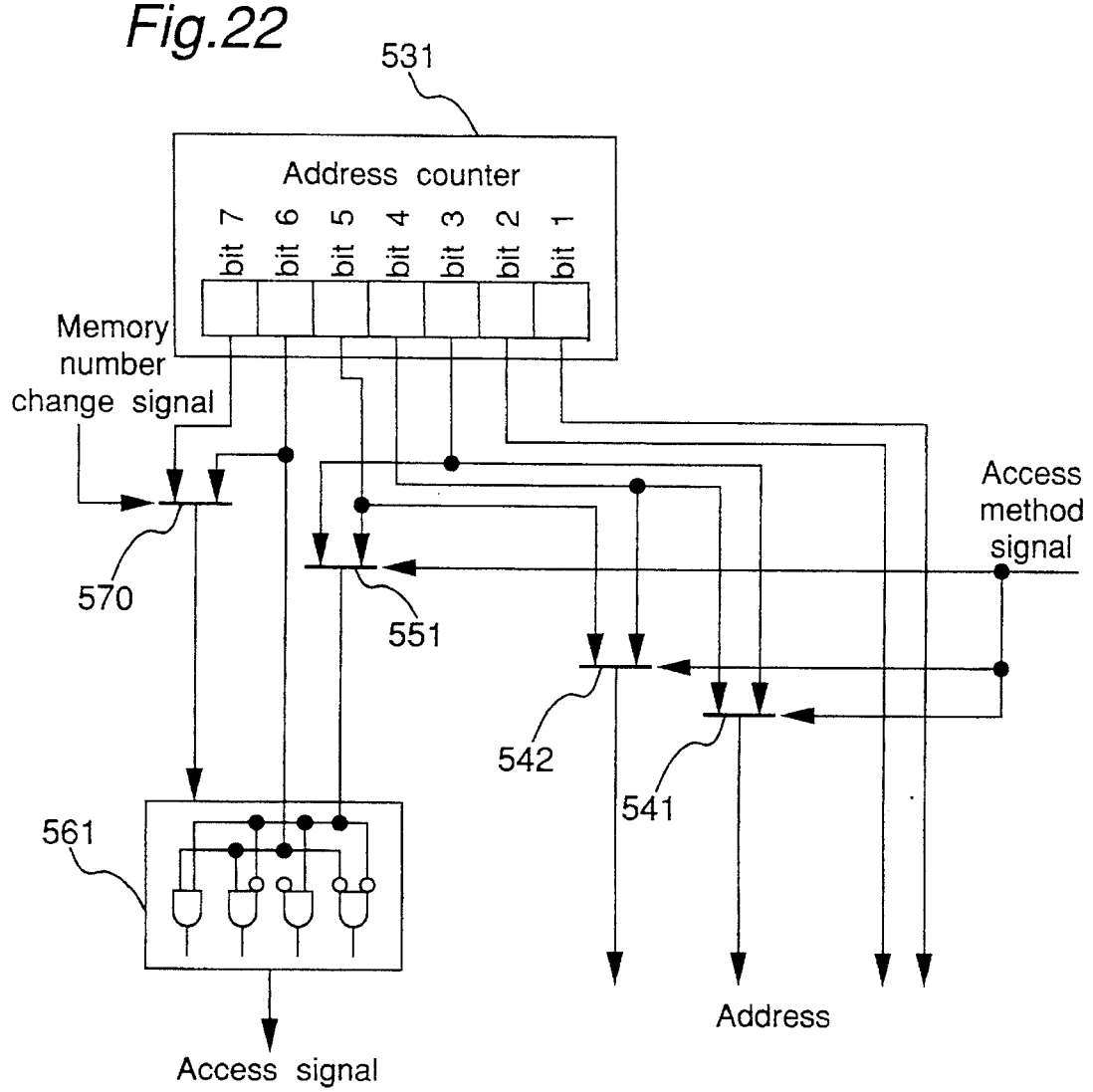
FIG. 22 is a block diagram of the address generator circuit of the seventh embodiment.

An example of the address generator of the seventh embodiment where m=1 and n=2 is described below with reference to FIGS. 21, 22, 23(a) and 23(b). In this example, sixteen data elements are stored in each of four memories. As shown in FIGS. 21 and 22, the address generator is basically the same as that of the sixth embodiment shown in FIG. 18 except for a 7-bit address counter 531 and a terminate signal selector 570 for selecting bits 6 or 7 according to a memory number change signal. The terminate signal selector 570 selects bit 7 when inputting data to all four memory elements according to one of the two kinds of memory number change signals, and selects bit 6 when inputting data to only two memory elements according to another of the memory number change signals.

As in the sixth embodiment, there are two main access methods: block access as shown in FIG. 19(a) and raster scan access as shown in FIG. 19(b). There are two memory number selector signals: one for storing data is all four memory elements of the memory 510, and another for storing data in only two of the four memory elements of the memory 510. When bit 7 is selected by the terminate signal selector 570 and data is input to the four memory elements, the operation is the same as that of the sixth embodiment explained above, and has not been explained here.

When bit 6 is selected by the terminate signal selector 570, data is input to two memory elements as described below. First, when block access is designated by the access method signal, the first address selector 541 selects bit 3, the second address selector 542 selects bit 4, and the memory address selector 551 selects bit 5. In other words, the selectors 541, 542 and 551 are set so that the lower four bits of the address counter 531 are input to each memory element of the memory 510 as an address, and the fifth bit of the address counter 531 is input to the access controller 561 as a memory address. When data input begins, the address counter 530 counts the number of data inputs, and the fifth bit of the address counter 531, which is the output of the memory address selector 551, and the highest two bits of the address counter 531 are decoded by the access controller 561 and sent memory access signals together with input data to the memory elements of the memory 510.

The input sequence of data in the block access mode is illustrated in FIG. 23(a). Portions marked as "1st memory", "2nd memory", "3rd memory" and "4th memory" indicate periods when data is written in the first to fourth memory elements. When storage of sixteen data elements in the two memory elements of the memory 510 is completed, the bit 6 terminate signal of the address counter 531 terminates writing data to the memory elements in the memory 510 by means of the access signal from the controller 561, so that data input ends.

When raster scan access is designated by the access method signal, the first address selector 541 selects bit 4, the second address selector 542 selects bit 5, and the memory address selector 551 selects bit 3. In other words, the selectors are set so that the lowest two bits and bits 4 and 5 of the address counter 531 are input to each memory element of memory 510 as an address, and the third bit of the address counter 531 is input as an memory address to the access controller 561. When data input begins, the address counter 531 counts the number of data inputs, and the third bit of the address counter 531, which is the output of the memory address selector 551, and the highest two bits of the address counter 531 are decoded by the access controller 561 and memory access signals are input to the memory elements of the memory 510 together with input data.

The input sequence of data in the raster scan access mode is shown in FIG. 23(b). Reference numeral "1" indicates the first memory is selected by the access signal; "2", "3", and "4" similarly indicate selection of the second, third and fourth memory elements. When storage of sixteen data elements in the two memory elements in the memory 510 is completed, the bit 6 terminate signal of the address counter 531 terminates writing data into the memory elements in the memory 510 by means of the access signal output from the access control circuit 561, so that data input ends. Thus, for ($2^2 \times 2^2 \times 2^1 \times 2^1$) data elements, it is possible to select between storing ($2^2 \times 2^2$) data elements in each of ($2^1 \times 2^1$) memories and reading/writing ($2^2 \times 2^2$) data elements from/to ($2^1 \times 2^0$) memories, by providing a selector therefor. Note that this embodiment can be easily expanded as an address generator capable elements of storing ($2^n \times 2^n$) of ($2^n \times 2^n \times 2^m \times 2^m$) data elements in ($2^m \times 2^m$) memories and reading/writing ($2^n \times 2^n$) data elements from/to ($2^m \times 2^{m-1}$) memories.

In the seventh embodiment of the present invention, an address generator further comprises a terminate signal selector 570 for selecting bit (n+n+m+m+1) or bit (n+ n+m+m). A memory number selector signal is provided to the terminate signal selector 570 to select access to $2^{2 \times m}$ memory elements or $2^m$ memory elements. The terminate signal selector 570 selects bit (n+n+m+m+1) when accessing $2^{2 \times m}$ memory elements, while it selects bit (n+n+m+m) when accessing $2^m$ memory elements.

As described above, by adding a small scale circuit of a terminate signal selector 570 to the address generator of the sixth embodiment, the address generator of the present embodiment can control the number of memory elements to/from which data is written/read, halving the data access time when the number of process blocks to be processed is less than a half of ($2^m \times 2^m$), or less than ($2^m \times 2^m$), and thus accelerating the data input/output time.

Figure 24:
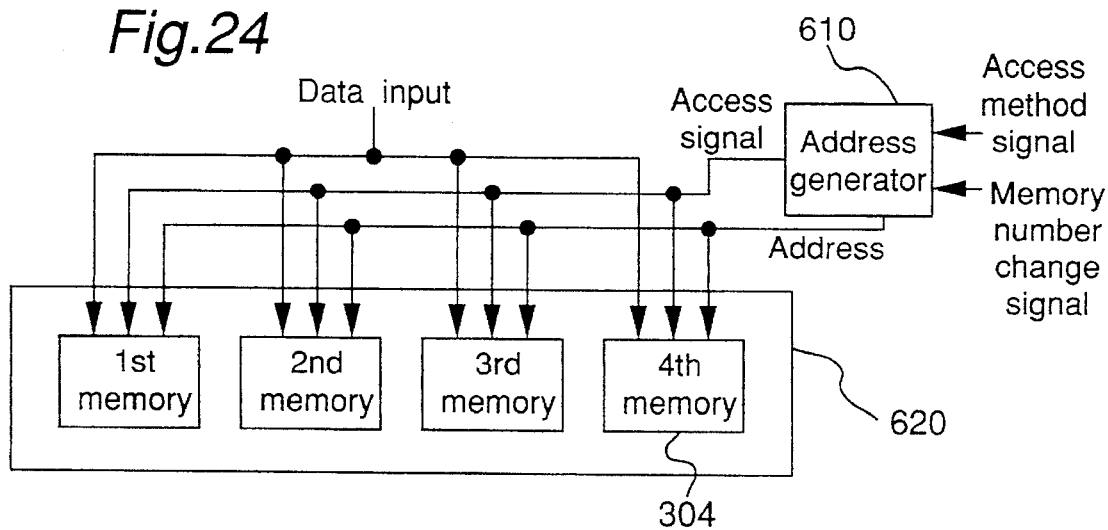
FIG. 24 is a block diagram of an address generator of another example of the seventh embodiment according to the present invention.
Figure 25:
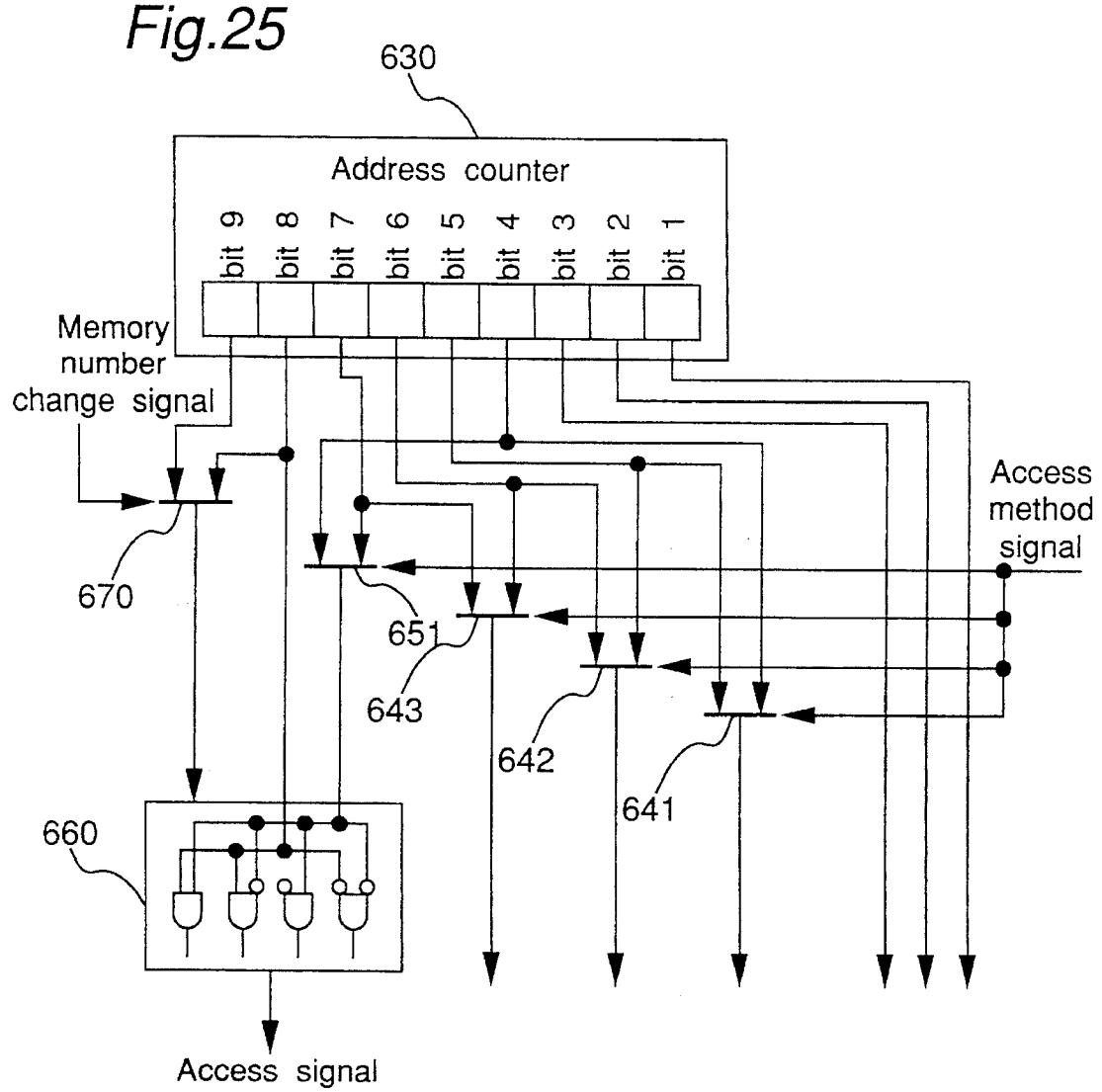
FIG. 25 is a block diagram of the address generator of the example.

Another example of the address generator of the seventh embodiment of the present invention is described below with reference to FIGS. 24 and 25, wherein m=1 and n=3, i.e. sixty four data elements are stored in each of four memory elements. As shown in the drawings, the address generator 610 comprises a 9-bit address counter 630, a first address selector 641 for selecting bit 4 or 5, a second address selector 642 for selecting bit 5 or 6, a third address selector 643 for selecting bit 6 or 7, a memory address selector 651 for selecting bit 7 or 4, an access controller 660, and a terminate signal selector 670 for selecting bit 8 or 9. As instructed by one of the two different memory number selector signals, the terminate signal selector 670 selects bit 9 when inputting data to all four memory elements, while it selects bit 8 when inputting data to only two memory elements.

As in the first example of the seventh embodiment explained above, there are two memory number selector signals: one for storing data in all four memory elements of the memory 620, and the other for storing data in only two of the memory elements in the memory 620.

The operation of this example when bit 9 is selected by the terminate signal selector 670 for input to four memory elements is described first. First, when block access is designated by the access method signal, the first address selector 641 selects bit 4, the second address selector 642 selects bit 5, the third address selector 643 selects bit 6, and the memory address selector 651 selects bit 7. In other words, the selectors are set so that the lowest six bits of the address counter 630 are input in each memory element in the memory 610 as the address, and the seventh bit of the address counter 630 is input to the access controller 660 as an memory address. When data input begins, the address counter 630 counts the number of data inputs, and the seventh bit of the address counter 630, which is the output of the memory address selector 651, and the highest two bits of the address counter 630 are decoded by the access controller 660 to be input in the memory elements in the memory 610 as memory access signals together with the input data.

The input sequence of data in the block access mode is explained next. When the storage of the sixty four data elements in the four memory elements in the memory 610 is completed, the bit 9 terminate signal of the address counter 630 terminates writing data to the memory elements in the memory 610 by means of the access signal output from the access controller 660, so that data input ends.

When raster scan access is designated by the access method signal, the first address selector 641 selects bit 5, the second address selector 642 selects bit 6, the third address selector 643 selects bit 7, and the memory address selector 651 selects bit 4. In other words, the selectors are set so that the lower three bits and bits 5, 6 and 7 of the address counter 630 are input in each memory element in the memory 610 as an address, and the bit 4 of the address counter 630 is input to the access controller 660 as an memory address. When data input begins, the address counter 630 counts the number of data inputs, and bit 4 of the address counter 630, which is the output of the memory address selector 651, and the highest two bits of the address counter 630 are decoded by the access controller 660 to be input in the memory elements in the memory 610 as memory access signals together with the input data.

The input sequence of data in the raster scan access mode is similar to that of the sixth embodiment shown in FIG. 20(*b*). When storage of the sixty four data elements in the four memory elements in the memory 610 is completed, the bit 9 terminate signal of the address counter 630 terminates writing data into the memory elements in the memory 610 by means of the access signal output from the access controller 660, so that data input ends.

The operation of this example when bit 8 is selected by the terminate signal selector 670 for input to two memory elements is described below. First, when block access is designated by the access method signal, the first address selector 641 selects bit 4, the second address selector 642 selects bit 5, the third address selector 643 selects bit 6, and the memory address selector 651 selects bit 7. In other words, the selectors are set so that the lowest six bits of the address counter 630 are input in each memory element in the memory 610 as an address, and bit 7 of the address counter 630 is input in the access controller 660 as an memory address. When data input begins, the address counter 630 counts the number of data inputs, and bit 7 of the address counter 630, which is the output of the memory address selector 651, and the highest two bits of the address counter 630 are decoded by the access controller 660 and input in the memory elements of the memory 610 as memory access signals together with input data.

The input sequence of data in the block access mode is similar to that of the first example of the seventh embodiment shown in FIG. 23(*a*). When storage of the sixty four data in the two memory elements of the memory 610 is completed, the bit 8 terminate signal of the address counter 630 terminates writing data to the memory elements of the memory 610 by means of the access signal output from the access controller 660, so that data input ends.

When raster scan access is designated by the access method signal, the first address selector 641 selects bit 5, the second address selector 642 selects bit 6, the third address selector 643 selects bit 7, and the memory address selector 651 selects bit 4. In other words, the selectors are set so that the lowest three bits and bits 5, 6, and 7 of the address counter are input in each memory element in the memory 610 as an address, and bit 4 of the address counter is input in the access controller 660 as an memory address. When data input begins, the address counter 630 counts the number of data inputs, and bit 4 of the address counter 630, which is the output of the memory address selector 651, and the highest two bits of the address counter 630 are decoded by the access controller 660 to be input in the memory elements in the memory 610 as memory access signals together with the input data.

The input sequence of data in the raster scan access mode is similar to that of the first example shown in FIG. 23(*b*). When the storage of sixty four data elements in the two memory elements in the memory 610 is completed, the bit 8 terminate signal of the address counter 630 terminates writing data into the memory elements in the memory 610 by means of the access signal output from the access controller 660, so that data input ends.

The address generator according to the seventh embodiment can process data in macro block units, i.e., one luminance signal block of 16×16 pixels and two color difference signal blocks of 8×8 pixels, as commonly used in image processing applications, in either block or raster scan access mode. Thus, the number of pins can be reduced because address pins are not needed. Furthermore, the cost also drops as the number of pins decreases. Because power dissipation by the input/output pins accounts for a relatively large percentage of total LSI device power dissipation, the reduction of the number of pins also reduces the power dissipation and power supply requirements of the device. In addition, by providing a small scale circuit of the terminate signal selector 670, it is possible to control data input to four memory elements when the luminance signal is input and to two memory elements when the color difference signals are input, thus reducing the data input time.

It is to be noted that while the fifth to seventh embodiments have been described above with reference to data input only, the invention is also used when applied to the data output operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A program controlled processor comprising:

plurality of vector processors, said plurality of vector processors executing a plurality of parallel instructions including parallel vector instructions, and executing vector operations based on the parallel vector instructions in pipeline processing;

a scalar processor, said scalar processor connected via a bus to said plurality of vector processors and executing a scalar operation;

an instruction memory for storing program instructions;

a sequencer for controlling the instruction memory;

a decoder for interpreting program instructions received from the sequencer, for controlling all of said vector processors so that said processors execute an identical operation if an instruction to be executed is a parallel vector instruction and for controlling the scalar processor to execute a scalar operation if an instruction to be executed is not a parallel vector instruction;

a vector distributor receiving two series of input vector data and for dividing each series of input vector data into a plurality of block vectors, wherein a number of block vectors is the same as that of vector processors, and for sending the block vectors to corresponding vector processors; and a vector coupler for coupling block vectors obtained by the vector operations in said plurality of vector processors to send an output vector;

wherein each of said vector processors comprises:

two input memories for storing two series of input block vectors; a vector processor for executing a vector operation on data including the block vectors received from the input memories; a first output memory for storing a vector result of the vector operation, the first output memory being connected to said vector coupler and to the vector processor, and a second output memory for storing a scalar result of the vector operation, the second output memory being connected to the bus between the scalar processor and the plurality of vector processors;

and wherein each of said input memories and said first output memory for storing block vectors comprises a plurality of buffer memories, each for storing block vectors; if block vector data is written in one of the plurality of buffer memories of each of said input memories by said vector distributor, then block vector data can be read from another of the plurality of buffer memories by said vector processor, and if block vector data is written in one of the plurality of buffer memories of each of said first output memories by said vector processor, then block vector data can be read from another of the plurality of buffer memories by said vector coupler, so that said distributor, said vector coupler and said vector processor operate independently of each other; and wherein if an instruction to be executed is a parallel vector instruction, of which a result is a vector, the vector processor stores the results of the processing in the vector processor and outputs the results to the vector coupler while if an instruction to be executed is a parallel vector instruction, of which a result is a scalar, the scalar processor receives the scalar results from the plurality of vector processors via the bus between said scalar processor and said plurality of vector processors; and wherein the program controlled processor further comprises an address generator for controlling access to the input memory or the first output memory to write or read $(2^{nx} \times 2^{ny})$ of $(2^{nx} \times 2^{ny} \times 2^{mx} \times 2^{my})$ data to or from $(2^{mx} \times 2^{my})$ input memory elements or the first output memory in the program controlled processor where nx, ny, mx and my are natural numbers and wherein nx, ny, mx and my correspond to a rectangular image area of $(2^{nx+mx}) \times (2^{ny+my})$ pixels which is divided into a plurality of image signals of rectangular blocks each comprising $2^{nx} \times 2^{ny}$ pixels; and wherein said address generator comprises:

an (nx+ny+mx+my)-bit address counter for counting data accesses when data access begins;

a switch circuit for changing a sequence of address counter output bits according to an access method signal to designate the sequence of the address counter output bits; and an access controller for sending memory access signals to said $(2^{mx} \times 2^{my})$ input memory elements;

wherein the switch circuit sends bits 1 to (nx+ny) to said $(2^{mx} \times 2^{my})$ input memory elements as an address and bits (nx+ny+1) to (nx+ny+mx+my) to the access controller.

2. The program controlled processor according to claim 1, wherein said access method signal designates a block scan method.

3. The program controlled processor according to claim 1, wherein said access method signal designates a raster scan method.

4. The program controlled processor according to claim 1, wherein mx=2, my=0, nx=1 and ny=3.

5. A program controlled processor comprising:

a plurality of vector processors, said plurality of vector processors executing a plurality of parallel instructions including parallel vector instructions, and executing vector operations based on the parallel vector instructions in pipeline processing;

a scalar processor, said scalar processor connected via a bus to said plurality of vector processors and executing a scalar operation;

an instruction memory for storing program instructions;

a sequencer for controlling the instruction memory;

a decoder for interpreting program instructions received from the sequencer, for controlling all of said vector processors so that said processors execute an identical operation if an instruction to be executed is a parallel vector instruction and for controlling the scalar processor to execute a scalar operation if an instruction to be executed is not a parallel vector instruction;

a vector distributor receiving two series of input vector data and for dividing each series of input vector data into a plurality of block vectors, wherein a number of block vectors is the same as that of vector processors, and for sending the block vectors to corresponding vector processors; and a vector coupler for coupling block vectors obtained by the vector operations in said plurality of vector processors to send an output vector;

wherein each of said vector processors comprises:
   two input memories for storing two series of input block vectors;
   a vector processor for executing a vector operation on data including the block vectors received from the input; a first output memory for storing a vector result of the vector operation, the first output memory being connected to said vector coupler and to the vector processor, and a second output memory for storing a scalar result of the vector operation, the second output memory being connected to the bus between the scalar processor and the plurality of vector processors;
   and wherein each of said input memories and said first output memory for storing block vectors comprises a plurality of buffer memories, each for storing block vectors; if block vector data is written in one of the plurality of buffer memories of each of said input memories by said vector distributor, then block vector data can be read from another of the plurality of buffer memories by said vector processor, and if block vector data is written in one of the plurality of buffer memories of each of said first output memories by said vector processor, then block vector data can be read from another of the plurality of buffer memories by said vector coupler, so that said distributor, said vector coupler and said vector processor operate independently of each other; and
wherein if an instruction to be executed is a parallel vector instruction, of which a result is a vector, the vector processor stores the results of the processing in the vector processor and outputs the results to the vector coupler while if an instruction to be executed is a parallel vector instruction, of which a result is a scalar, the scalar processor receives the scalar results from the plurality of vector processors via the bus between said scalar processor and said plurality of vector processors; and
wherein the program controlled processor further comprises an address generator for controlling access to the input memory or the first output memory to write or read $2^{nx} \times 2^{ny}$ of $(2^{nx} \times 2^{ny} \times 2^{mx} \times 2^{my})$ data to or from $(2^{mx} \times 2^{my})$ input memory elements or the first output memory in the program controlled processor where nx, ny, mx and my are natural numbers and wherein nx, ny, mx and my correspond to a rectangular image area of $(2^{nx+mx}) \times (2^{ny+my})$ pixels which is divided into a plurality of image signals of rectangular blocks each comprising $2^{nx} \times 2^{ny}$ pixels; and
wherein nx=ny=n and mx=my=m, and said address generator comprises:
an (n+n+m+m)-bit address counter for counting data accesses when data access begins;
a switch circuit comprising i address selectors ($1 \leq i \leq n$) for selecting bit (n+i) or bit (n+m+i) and j memory address selectors ($1 \leq j \leq m$) for selecting bit (n+n+j) when bit (n+i) is selected by the i address selectors and for selecting bit (n+j) when bit (n+m+i) is selected by the i address selectors; and
an access controller for sending memory access signals to $(2^m \times 2^m)$ memory elements, wherein i, j, m and n are natural numbers;
wherein bits 1 to n of outputs of the address counter and the i address selectors are output as an address to $2^{2 \times m}$ memory elements, and outputs of the j memory address selectors and bits (n+n+m+1) to (n+n+m+m) of the address counter are sent to the access controller.

6. The program controlled processor according to claim 5, wherein m=1 and n=2.

7. A program controlled processor comprising:
   a plurality of vector processors, said plurality of vector processors executing a plurality of parallel instructions including parallel vector instructions, and executing vector operations based on the parallel vector instructions in pipeline processing;
   a scalar processor, said scalar processor connected via a bus to said plurality of vector processors and executing a scalar operation;
   an instruction memory for storing program instructions;
   a sequencer for controlling the instruction memory;
   a decoder for interpreting program instructions received from the sequencer, for controlling all of said vector processors so that said processors execute an identical operation if an instruction to be executed is a parallel vector instruction and for controlling the scalar processor to execute a scalar operation if an instruction to be executed is not a parallel vector instruction;
   a vector distributor receiving two series of input vector data and for dividing each series of input vector data into a plurality of block vectors, wherein a number of block vectors is the same as that of vector processors, and for sending the block vectors to corresponding vector processors; and
   a vector coupler for coupling block vectors obtained by the vector operations in said plurality of vector processors to send an output vector;
   wherein each of said vector processors comprises:
      two input memories for storing two series of input block vectors; a vector processor for executing a vector operation on data including the block vectors received from the input memories; a first output memory for storing a vector result of the vector operation, the first output memory being connected to said vector coupler and to the vector processor, and a second output memory for storing a scalar result of the vector operation, the second output memory being connected to the bus between the scalar processor and the plurality of vector processors;
      and wherein each of said input memories and said first output memory for storing block vectors comprises a plurality of buffer memories, each for storing block vectors; if block vector data is written in one of the plurality of buffer memories of each of said input memories by said vector distributor, then block vector data can be read from another of the plurality of buffer memories by said vector processor, and if block vector data is written in one of the plurality of buffer memories of each of said first output memories by said vector processor, then block vector data can be read from another of the plurality of buffer memories by said vector coupler, so that said distributor, said vector coupler and said vector processor operate independently of each other; and
   wherein if an instruction to be executed is a parallel vector instruction, of which a result is a vector, the vector processor stores the results of the processing in the vector processor and outputs the results to the vector coupler while if an instruction to be executed is a parallel vector instruction, of which a result is a scalar, the scalar processor receives the scalar results from the plurality of vector processors via the bus between said scalar processor and said plurality of vector processors; and wherein the program controlled processor further comprises an address generator for controlling access to the input memory or the first output memory to write or read $(2^{nx} \times 2^{ny})$ of $(2^{nx} \times 2^{ny} \times 2^{mx} \times 2^{my})$ data to or from $(2^{mx} \times 2^{my})$ input memory elements or the first output memory in the program controlled processor where nx, ny, mx and my are natural numbers and wherein nx, ny, mx and my correspond to a rectangular image area of $(2^{nx+mx}) \times (2^{ny+my})$ pixels which is divided into a plurality of image signals of rectangular blocks each comprising $2^{nx} \times 2^{ny}$ pixels; and wherein mx=my=m and nx=ny=n, and said address generator comprises:

an (n+n+m+m+1)-bit address counter for counting data accesses when data access begins;

i address selectors ($1 \leq i \leq n$) for selecting bit (n+i) or bit (n+m+i);

j memory address selectors ($1 \leq j \leq m$) for selecting bit (n+n+j) when bit (n+i) is selected by the i address selectors, and for selecting bit (n+j) when bit (n+m+i) is selected by the i address selectors;

a terminate signal selector for selecting bit (2×n+2×m+1) or bit (2×n+2×m) according to a memory number selection signal for selecting access to $2^{2 \times m}$ memory elements or $2^m$ memory elements; and an access controller for sending memory access signals to $(2^m \times 2^m)$ memory elements, wherein i, j, m and n are natural numbers;

wherein bits 1 to n of the address counter and i address selector outputs are output as an address to the $2^{2 \times m}$ memory elements, and outputs of the j memory address selector and bits (n+n+m+1) to (n+n+m+m) of the address counter are input to the access controller, and the terminate signal selector selects bit (n+n+m+m+1) if the memory number selection signal selects the access to the $2^{2 \times m}$ memory elements, and selects bit (n+n+m+m) if the memory number selection signal selects the access to the $2^m$ memory elements.

8. The program controlled processor according to claim 7, wherein m=1 and n=2.

9. The program controlled processor according to claim 7, wherein m=1 and n=3.

* * * * *